US 10,485,008 B2

(12) United States Patent
Arikawa et al.

(10) Patent No.: US 10,485,008 B2
(45) Date of Patent: Nov. 19, 2019

(54) SCHEDULING APPARATUS AND METHOD

(71) Applicant: NIPPON TELEGRAPH AND TELEPHONE CORPORATION, Tokyo (JP)

(72) Inventors: Yuki Arikawa, Tokyo (JP); Hiroyuki Uzawa, Tokyo (JP); Kenji Kawai, Tokyo (JP); Satoshi Shigematsu, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 15/756,016

(22) PCT Filed: Aug. 26, 2016

(86) PCT No.: PCT/JP2016/074978
§ 371 (c)(1),
(2) Date: Feb. 27, 2018

(87) PCT Pub. No.: WO2017/038683
PCT Pub. Date: Mar. 9, 2017

(65) Prior Publication Data
US 2018/0242337 A1      Aug. 23, 2018

(30) Foreign Application Priority Data
Aug. 31, 2015    (JP) .................. 2015-170295

(51) Int. Cl.
*H04W 72/12*         (2009.01)
*H04B 7/024*         (2017.01)
(Continued)

(52) U.S. Cl.
CPC ............ *H04W 72/12* (2013.01); *H04B 7/024* (2013.01); *H04W 24/06* (2013.01)

(58) Field of Classification Search
None
See application file for complete search history.

(56) References Cited

U.S. PATENT DOCUMENTS 8,311,002 B2    11/2012   Nyberg et al.
2007/0280175 A1  12/2007   Cheng et al.
(Continued)

FOREIGN PATENT DOCUMENTS

CN    102196504 A   9/2011
CN    103825677 A   5/2014
(Continued)

OTHER PUBLICATIONS

Taoka et al., "MIMO and CoMP in LTE-Advanced", NTT DOCOMO Technical Journal, vol. 18, No. 2, Jul. 2010, 18 pages.
(Continued)

*Primary Examiner* — Brian S Roberts
*Assistant Examiner* — Cassandra L Decker
(74) *Attorney, Agent, or Firm* — Womble Bond Dickinson (US) LLP

(57) ABSTRACT

A convergence pattern selection unit (10A) sequentially generates a plurality of different patterns based on designated initial conditions, selects, as a convergence pattern, a pattern in which evaluation value has converged to an extreme value, and repeatedly executes selection of the convergence pattern by changing the initial conditions every time the convergence pattern is selected. A transmission pattern determination unit (10B) selects, as an optimum transmission pattern, one of the convergence patterns obtained by the convergence pattern selection unit (10A), which has the highest evaluation value. This allows searches for an optimum transmission pattern having a better evaluation value.

6 Claims, 16 Drawing Sheets

(51) Int. Cl.
*G06N 5/00* (2006.01)
*H04W 24/06* (2009.01)

(56) References Cited

U.S. PATENT DOCUMENTS

| | | | |
|---|---|---|---|
| 2010/0041407 A1 | 2/2010 | Caire et al. | |
| 2010/0144334 A1* | 6/2010 | Gorokhov | H04L 5/0035 |
| | | | 455/418 |
| 2010/0261482 A1 | 10/2010 | Guey | |
| 2014/0099984 A2 | 4/2014 | Tian et al. | |
| 2017/0223583 A1* | 8/2017 | Huang | H04W 24/02 |

FOREIGN PATENT DOCUMENTS

| | | |
|---|---|---|
| JP | 2010-220253 A | 9/2010 |
| JP | 2011-193441 A | 9/2011 |
| JP | 2012-500522 A | 1/2012 |
| JP | 2015-111788 A | 6/2015 |
| WO | 2010-019613 A1 | 2/2010 |

OTHER PUBLICATIONS

Girici et al., "Proportional Fair Scheduling Algorithm in OFDMA-Based Wireless Systems with QoS Constraints", Journal of Communications and Networks, vol. 12, No. 1, Feb. 2010, pp. 30-42.
Fraser, Sandy, "LTE Channel State Information (CSI)", Agilent Technologies, 2012, 66 pages, Available at <http://www.keysight.com/upload/cmc_upload/All/31May2012_LTE.pdf?&cc=JP&lc=jpn>.
Arikawa et al., "Practical resource scheduling in massive-cell deployment for 5G mobile communications systems", International Symposium on Intelligent Signal Processing and Communication Systems (ISPACS), 2015, pp. 456-461.
3rd Generation Partnership Project, "Technical Specification Group Radio Access Network; Evolved Universal Terrestrial Radio Access (E-UTRA); Physical layer procedures", Release 8, 3GPP, TS 36.213, V8.2.0, Mar. 2008, 31 pages.
International Search Report and Written Opinion received for PCT Patent Application No. PCT/JP2016/074978, dated Nov. 15, 2016, 14 pages (7 pages of English Translation and 7 pages of Original Document).
International Preliminary Report on Patentability received for PCT Patent Application No. PCT/JP2016/074978, dated Mar. 15, 2018, 12 pages (7 pages of English Translation and 5 pages of Original Document).
Supplementary European Search Report and Written Opinion received for EP Patent Application No. 16841715.2, dated Mar. 15, 2019, 11 pages.

* cited by examiner (a)

(b)

| PATTERN | TP #1 | TP #2 | TP #3 | ---------- |
|---|---|---|---|---|
| PATTERN #1 | 0 | 5 | 8 | |
| PATTERN #2 | 1 | 7 | Blank | ---------- |
| PATTERN #3 | 3 | 6 | 4 | |

SCHEDULING APPARATUS AND METHOD

TECHNICAL FIELD

The present invention relates to a radio network control technique and more particularly to a scheduling technique for allocating the radio resources of a radio network by designating the operation contents (transmission state) of each transmission point in the radio network.

BACKGROUND ART

In the field of radio networks, high-density arrangement of small cells to accommodate rapidly increasing mobile traffic has been investigated. Small cells have a smaller cell radius as compared to a macro cell, and operate with lower transmission power from a base station (transmission point: TP). Thus, the number of mobile terminals (User Equipments: UEs) sharing the same frequency within the cell can be reduced, and a per-terminal throughput can be improved.

However, high-density arrangement of small cells prompt greater interference power from an adjacent cell. For example, a case in which a plurality of TPs simultaneously transmits data to different UEs using the same frequency band is considered. In this case, for each UE, transmission signals from TPs other than a TP that transmits the data destined for the UE cause interference power to a desired reception signal, thereby rather decreasing the throughput.

To solve this problem, a next-generation radio communication interface such as LTE (Long Term Evolution)/LTE-A adopts CoMP (Coordinated Multi-Point transmission/reception) scheduling to suppress interference power between cells within the same frequency band (non-patent literature 1). CoMP scheduling schedules TP operation contents (transmission destination UE/transmission stop) within the same frequency band.

More specifically, a plurality of transmission point-user equipment combination patterns are evaluated using a predetermined evaluation function, and a pattern having a highest evaluation value is searched for, and is selected/output as an optimum transmission pattern.

In examples of a combination pattern shown in FIG. 14, for example, in pattern #1, UE0, UE5, UE8, . . . are assigned as transmission destinations of TP1, TP2, TP3, . . . When no transmission destination is assigned and a transmission stop is set, "Blank" is written, like TP3 of pattern #2.

In addition, the predetermined evaluation function indicates the sum of TP-specific lower evaluation values calculated based on external evaluation information that is input externally, and each lower evaluation value is a value obtained by dividing the instantaneous throughput of the transmission destination UE of the corresponding TP by an average throughput based on a proportional-fairness method (non-patent literature 2). The external evaluation information at this time represents, for example, the average throughput of each UE, the untransmitted data amount of each UE, and the TP-specific channel quality state of each UE. The channel quality state is indicated by, for example, CQI (Channel Quality Indicator) fed back from the UE (non-patent literatures 3 and 4).

To efficiently search for a combination pattern having the highest evaluation value, a method that applies a hill-climbing method to CoMP scheduling can be considered. The hill-climbing method is a search algorithm of repeating a small correction as many times as possible to obtain a desired pattern having the highest evaluation value. In this search, a small correction is a correction of the transmission destination of one of the TPs of the combination pattern to improve the evaluation value.

As shown in FIG. 15, a scheduling apparatus 50 includes a pattern generation unit 51 for generating transmission point-user equipment combination patterns, a pattern evaluation unit 52 for calculating the evaluation value of each of the generated patterns using an evaluation function, a transmission pattern selection unit 53 for holding the pattern having the highest evaluation value among the generated patterns, and an end determination unit 54 for detecting that the upper limit of an evaluation count is reached, and externally outputting, as an optimum transmission pattern, the pattern having the highest evaluation value among the generated patterns. The functions of the respective units will be described in detail below.

<Pattern Generation Unit>

The pattern generation unit 51 changes the transmission destination of only one of the TPs of the transmission pattern input from a transmission pattern selection unit (to be described later), and then outputs the changed pattern.

As shown in FIG. 16, upon receiving a start instruction from the outside of the scheduling apparatus 50, the pattern generation unit 51 performs an initialization process. In this initialization process, the selected flags of all the TPs are cleared to 0, the presence/absence of trial of each of the transmission destinations of all the TPs is cleared, and the transmission destinations of all the TPs in the internally held pattern are rewritten to indicate a transmission stop (Blank).

After the initialization process, a single TP (S_TP) in which the transmission destination is to be changed is randomly selected. Note that the TP to be selected is a TP with the selected flag "0". Next, the transmission destination of S_TP in the internally held pattern is changed. This transmission destination is a UE in which presence/absence of trial of the transmission destination indicates "absence" in the transmission destination UE list of S_TP among TP-specific transmission destination UE lists input from the outside of the scheduling apparatus 50. Along with the change processing, the presence/absence of trial of the transmission destination is updated to the status of "presence". When the presence/absence of trial of each of all the UEs of the transmission destination UE list of S_TP indicates "presence", another TP is reselected as S_TP, and the same transmission destination change process is performed. The internally held pattern that has been changed is output from the pattern generation unit 51. After the pattern generation processing, the pattern generation unit 51 waits for an input from the transmission pattern selection unit 53. Upon detecting the input, the input transmission pattern is set as the internally held pattern, and the same change process is performed.

<Pattern Evaluation Unit>

The pattern evaluation unit 52 calculates, using the evaluation function, the evaluation value of the pattern input from the pattern generation unit 51. The calculated evaluation value and the evaluated pattern are output to the transmission pattern selection unit 53.

<Transmission Pattern Selection Unit>

The transmission pattern selection unit 53 selects/outputs, as a transmission pattern, the pattern having the highest evaluation value among the generated evaluated patterns.

As shown in FIG. 17, upon receiving a start instruction from the outside of the scheduling apparatus 50, the transmission pattern selection unit 53 performs an initialization process. In this initialization process, an internally held evaluation value is set to 0, and the transmission destinations of all the TPs of the internally held pattern are rewritten to indicate a transmission stop (Blank).

After the initialization process, when the evaluated pattern is input from the pattern evaluation unit 52, it is confirmed whether the evaluation value that is input together with the evaluated pattern exceeds the internally held evaluation value. When the input evaluation value exceeds the internally held evaluation value, which indicates that the input evaluated pattern is better, and thus the internally held pattern and internally held evaluation value are updated to the evaluated pattern and evaluation value; otherwise, the internally held pattern and internally held evaluation value are maintained. After the update process, the transmission pattern selection unit 53 outputs the internally held pattern and internally held evaluation value to the end determination unit 54.

<End Determination Unit>

The end determination unit 54 counts the evaluation count of the evaluated patterns. When the count value reaches the upper limit (end condition) of the evaluation count input from the outside of the scheduling apparatus 50, the end determination unit 54 determines the end of the search, sets the end flag to 1, and outputs, as an optimum transmission pattern (scheduling result), the transmission pattern output from the transmission pattern selection unit 53 at this time. Note that the end flag and the count value of the evaluation count are initialized to 0 every time a start instruction is received.

By using the scheduling apparatus 50, a transmission pattern output from the transmission pattern selection unit 53 has an evaluation value which is continuously and monotonously improved as the evaluation is repeated, as shown in FIG. 18. By this, the transmission pattern can converge to a pattern that has a high evaluation value after a sufficient numbers of evaluations are repeated.

The scheduling apparatus 50 selects a transmission pattern corresponding to the thus obtained convergence value, and outputs it as a scheduling result.

In this arrangement example, however, when selecting a transmission pattern from generated patterns, the hill-climbing method is used as a search algorithm to search for an extreme value of the evaluation values of the patterns. Therefore, even if the convergence value is not the maximum value but a relatively low extreme value, the initially found extreme value is unfavorably selected as a final convergence value, thereby ending the subsequent search. Accordingly, there is a problem that a pattern corresponding to the relatively low convergence value is selected as an optimum transmission pattern, that is, a scheduling result.

RELATED ART LITERATURE

Non-Patent Literature

Non-Patent Literature 1: Taoka, et al., "MIMO and inter-cell cooperative transmission and reception technology in LTE-Advanced", NTT DOCOMO Technical Journal, Vol. 18, No. 2, July 2010

Non-Patent Literature 2: Tolga Giri, et al., "Proportional Fair Scheduling Algorithm in OFDMA-Based Wireless Systems with QoS Constraints", JOURNAL OF COMMUNICATIONS AND NETWORKS, Vol. 12, No. 1, FEBRUARY 2010

Non-Patent Literature 3: Sandy Fraser, "LTE Channel State Information (CSI)", http://www.keysight.com/upload/cmc_upload/All/31May2012_LTE.pdf?&cc=JP&lc=jpn Non-Patent Literature 4: 3GPP, TS 36.213 (V.8.2.0)

DISCLOSURE OF INVENTION

Problem to be Solved by the Invention

The present invention has been made in view of the above-described problem, and an object of the present invention is to provide a scheduling technique capable of searching an optimum transmission pattern that has a higher evaluation value.

Means of Solution to the Problem

In order to achieve the object of the present invention, there is provided a scheduling apparatus that generates a plurality of patterns each indicating combinations of a plurality of transmission points forming a radio network system and user equipments for performing radio communication with the transmission points, and the scheduling apparatus that selects an optimum transmission pattern indicating optimum combinations of transmission points and user equipments based on evaluation values of the patterns by a predetermined search algorithm, the apparatus comprising a convergence pattern selection unit configured to generate sequentially a plurality of different patterns based on designated initial conditions, to select, as a convergence pattern, the pattern in which evaluation value has converged to an extreme value, and repeatedly execute selection of the convergence pattern by changing the initial conditions every time the convergence pattern is selected, and a transmission pattern determination unit configured to select, as the optimum transmission pattern, one of the convergence patterns with the highest evaluation value obtained by the convergence pattern selection unit.

There is also provided a scheduling method of generating a plurality of patterns each indicating combinations of a plurality of transmission points forming a radio network system and user equipments for performing radio communication with the transmission points, and selecting an optimum transmission pattern indicating optimum combinations of transmission points and user equipments based on evaluation values of the patterns by a predetermined search algorithm, the method comprising a convergence pattern selection step of sequentially generating a plurality of different patterns based on designated initial conditions, selecting, as a convergence pattern, the pattern in which evaluation value has converged to an extreme value, and repeatedly executing selection of the convergence pattern by changing the initial conditions every time the convergence pattern is selected, and a transmission pattern determination step of selecting, as the optimum transmission pattern, one of the convergence patterns with the highest evaluation value obtained in the convergence pattern selection step.

Effect of the Invention

According to the present invention, every time a pattern in which an evaluation value has converged to an extreme value is selected as a convergence pattern, a convergence pattern selection is repeatedly executed for a plurality of times by changing initial conditions that are used to generate a pattern, thereby selecting one of the obtained convergence patterns which has the highest evaluation value as an optimum transmission pattern. Therefore, as compared to a case in which an initially found extreme value is selected as a final convergence value, and ending the subsequent search, it is possible to select a pattern having a higher convergence value as an optimum transmission pattern.

In a scheduling process, a scheduling period is defined, and thus, there is an upper limit of an evaluation count. So that it is necessary to appropriately distribute the evaluation count in conducting each search. According to this embodiment, since a new search starts after convergence is detected, it is possible to avoid a situation in which the evaluation count is insufficient in conducting one search, and executing a next search before reaching a convergence. Furthermore, starting a new search after detecting a convergence is equivalent to distributing a necessary and sufficient evaluation count in each of the searches, thereby making it possible to efficiently use the limited evaluation count.

BEST MODE FOR CARRYING OUT THE INVENTION

Embodiments of the present invention will be described next with reference to the accompanying drawings.
[First Embodiment]
A scheduling apparatus 10 according to the first embodiment of the present invention will be described first with reference to FIG. 1.

This scheduling apparatus 10 is an apparatus for allocating the radio resources of a radio network, and has a function of executing CoMP scheduling for calculating an evaluation value for each of a plurality of transmission point-user equipment combination patterns, and selecting an optimum pattern based on the obtained evaluation values to suppress interference power between cells within the same frequency band.

Figure 1:
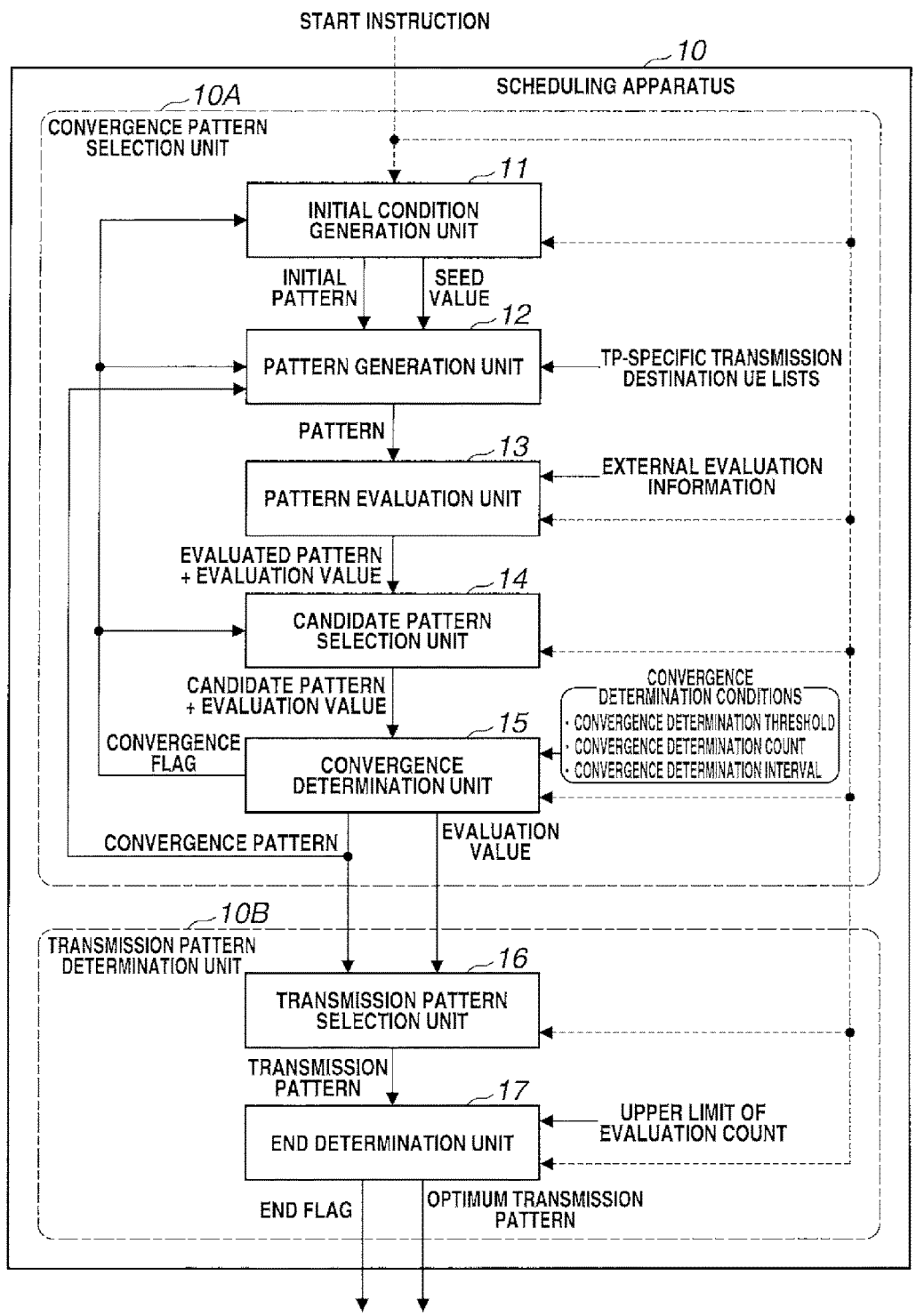
FIG. 1 is a block diagram showing the arrangement of a scheduling apparatus according to the first embodiment.

As shown in FIG. 1, the scheduling apparatus 10 according to this embodiment is provided with an initial condition generation unit 11, a pattern generation unit 12, a pattern evaluation unit 13, a candidate pattern selection unit 14, a convergence determination unit 15, a transmission pattern selection unit 16, and an end determination unit 17 as main functional units. As compared to the above-described arrangement shown in FIG. 15, the initial condition generation unit 11, the candidate pattern selection unit 14, and the convergence determination unit 15 are newly provided.

Among these functional units, the initial condition generation unit 11, the pattern generation unit 12, the pattern evaluation unit 13, the candidate pattern selection unit 14, and the convergence determination unit 15 form a convergence pattern selection unit 10A. That is, the convergence pattern selection unit 10A has a function of sequentially generating a plurality of different patterns based on designated initial conditions, and selecting, as a convergence pattern, a pattern in which an evaluation value has converged to an extreme value by applying the hill-climbing method as a search algorithm to the generated patterns, and a function of repeatedly executing selection of the convergence pattern a plurality of times by changing the initial conditions every time the convergence pattern is selected.

Among the functional units, the transmission pattern selection unit 16 and the end determination unit 17 form a transmission pattern determination unit 10B. That is, the transmission pattern determination unit 10B has a function of selecting, as an optimum transmission pattern, one of the convergence patterns obtained by the convergence pattern selection unit 10A, which has the highest evaluation value.

In the present invention, a candidate pattern indicates a pattern having an evaluation value higher than that of a previous pattern in a search based on the same initial conditions, and the convergence pattern indicates a pattern obtained when the evaluation value converges to the highest extreme value in a search based on the same initial conditions. The convergence pattern is the same as the candidate pattern before the evaluation value converges in the searches based on the same initial conditions. A transmission pattern indicates a pattern having an evaluation value higher than that of a previous convergence pattern, among convergence patterns obtained in searches based on different initial conditions. The optimum transmission pattern indicates a transmission pattern obtained when an evaluation count for patterns generated in each search reaches the upper limit.

The functions and processing operations of the functional units of the scheduling apparatus 10 according to this embodiment will be described in detail next.
<Initial Condition Generation Unit>
The initial condition generation unit 11 has a function of generating and outputting an initial pattern and a seed value to be used to generate a pattern in the pattern generation unit 12.

More specifically, the initial condition generation unit 11 has, as a function associated with generation of an initial pattern, a function of generating and outputting an initial pattern in which a transmission stop is set for all transmission points, when outputting an initial pattern first.

The initial condition generation unit 11 has, as functions associated with generation of a seed value, a function of generating and outputting a seed value to be used to generate a pattern when outputting an initial pattern for the first time, and a function of generating and outputting a seed value having a unique value every time the convergence determiner 15 detects a convergence. Note that when performing the generating process at the time the convergence is detected by the convergence determination unit 15, in order to set initial conditions different from those in the initial search, a unique value, that is, a value which has not been generated from when the search starts until the generating process is set as the seed value.

In the initial condition generation unit 11, a timing of generating the initial pattern and seed value as the initial conditions is immediately after a start instruction input from the outside of the scheduling apparatus 10 is received, and when the convergence determination unit 15 detects a convergence. That is, when a convergence flag as a signal indicating completion of convergence is set to 1, only the seed value is changed.

Note that the present invention incorporates a method of changing one or both of the initial pattern and the seed value as a method of changing the initial conditions when the convergence determination unit 15 detects a convergence.

This embodiment will exemplify a case in which a search is repeatedly executed by changing the seed value when the convergence determination unit 15 detects a convergence, and using the same initial pattern. The second embodiment (to be described later) will exemplify a case in which a search is repeatedly executed by changing both the initial pattern and the seed value when the convergence determination unit 15 detects convergence.

<Pattern Generation Unit>

The pattern generation unit 12 has a function of generating a plurality of different patterns based on the initial pattern and seed value output from the initial condition generation unit 11, and sequentially outputting the generated patterns.

More specifically, the pattern generation unit 12 has, as functions associated with pattern generation, a function of selecting, as a change target transmission point, one of the transmission points of the initial pattern output from the initial condition generation unit 11 at the start of pattern generation, generating a pattern by changing a user equipment as a transmission destination only for the change target transmission point, and outputting the generated pattern, and a function of, every time the convergence determination unit 15 outputs the convergence pattern, selecting, as a change target point, one of the transmission points of the convergence pattern, generating a pattern by changing a user equipment as a transmission destination only for the change target transmission point, and outputting the generated pattern.

The pattern generation unit 12 has, as a function of selecting a change target point, a function of selecting the change target transmission point based on a random number generated from the seed value output from the initial condition generation unit 11.

Figures 14, 15:
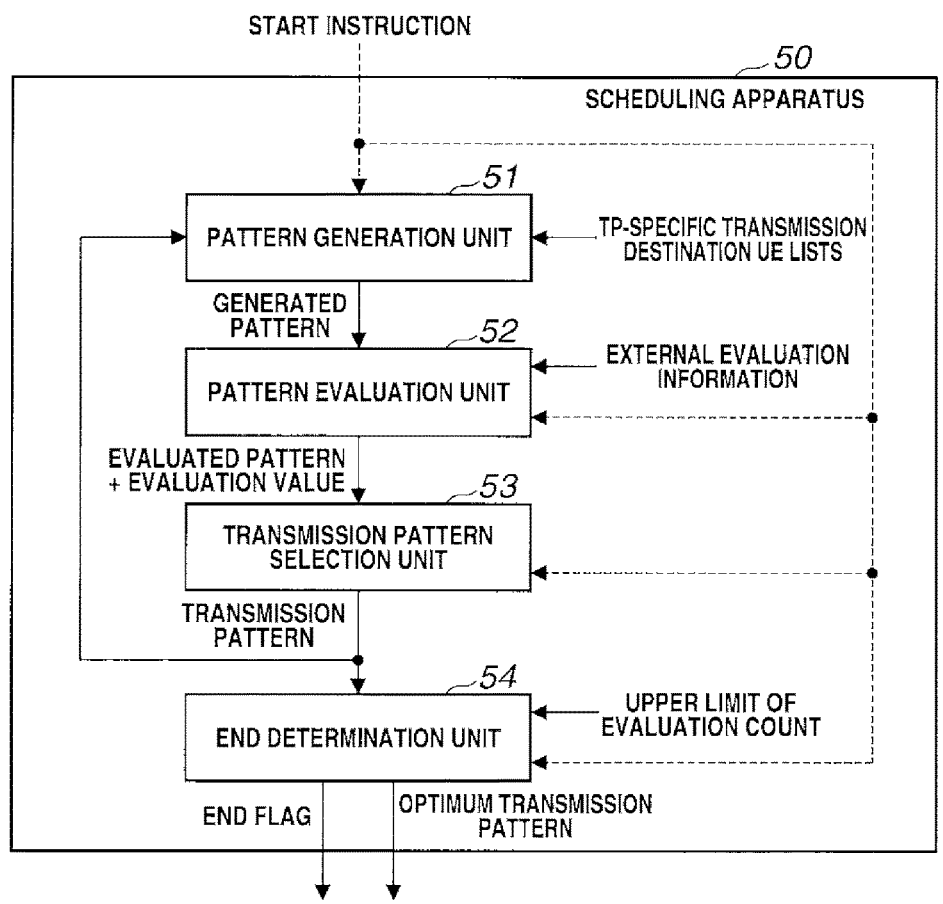
FIG. 14 is a table showing examples of a transmission point-user equipment combination pattern.
FIG. 15 is a block diagram showing an example of the arrangement of a scheduling apparatus.
Figure 16:
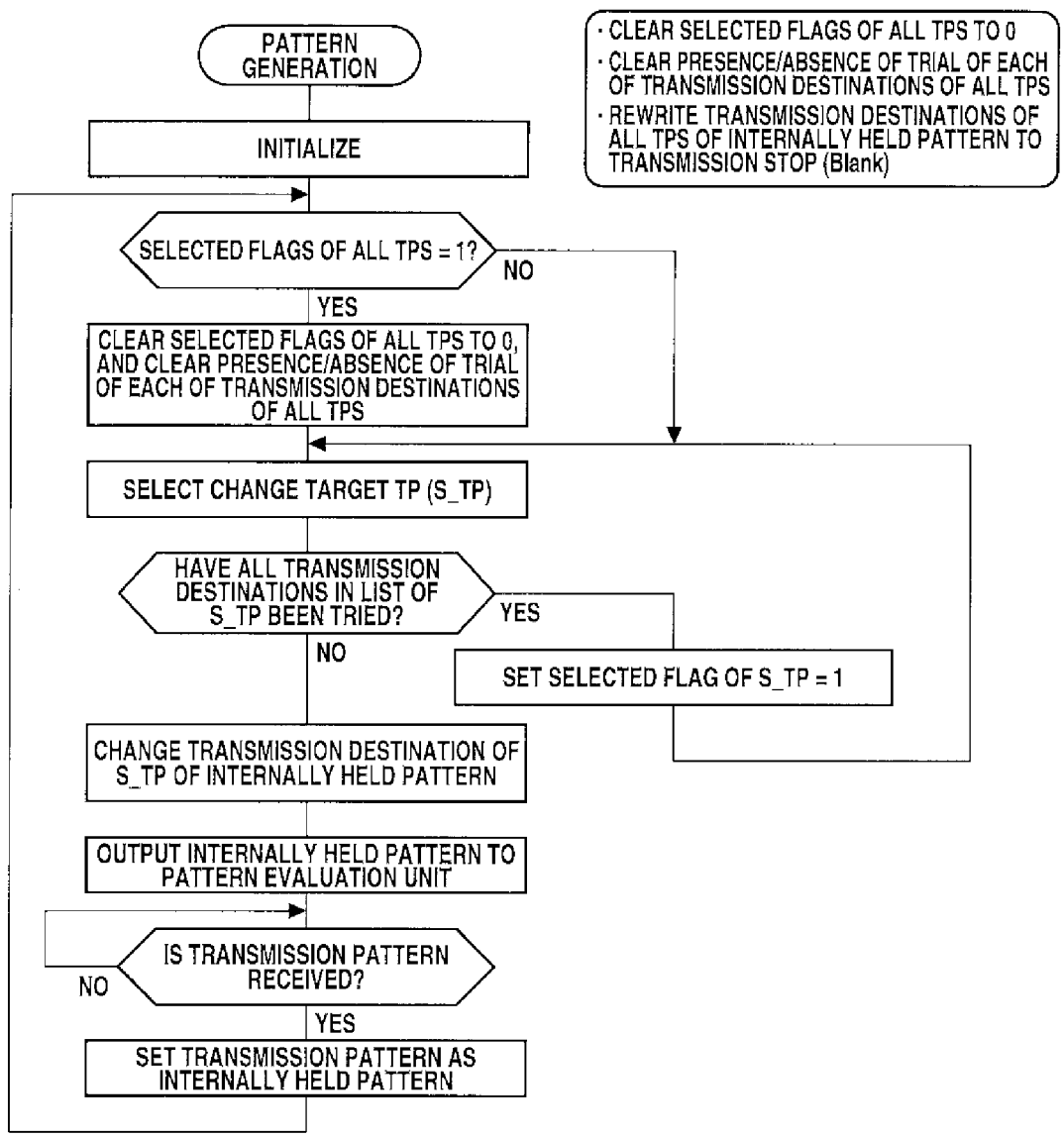
FIG. 16 is a flowchart illustrating pattern generation processing shown in FIG. 15.
Figure 17:
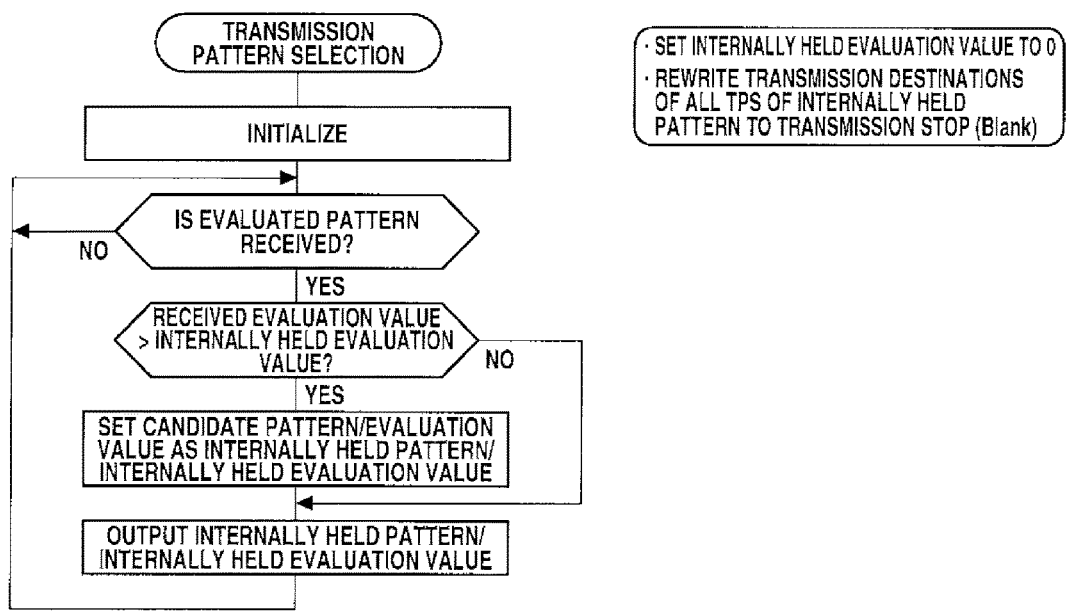
FIG. 17 is a flowchart illustrating transmission pattern selection processing shown in FIG. 15.
Figure 18:
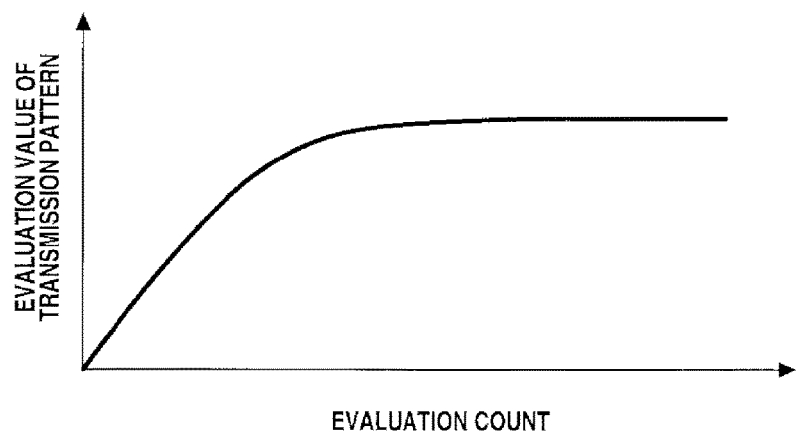
FIG. 18 is a graph showing transition of a pattern evaluation value.

The pattern generation unit 12 is basically the same as that shown in FIG. 15 described above except that the pattern generation unit 12 starts generation from the initial pattern from the initial condition generation unit 11, and except that the pattern generation unit 12 returns the state back to the initial state when the convergence flag as a signal, that is input from the convergence determination unit 15, shows 1 indicating completion of convergence.

Figure 2:
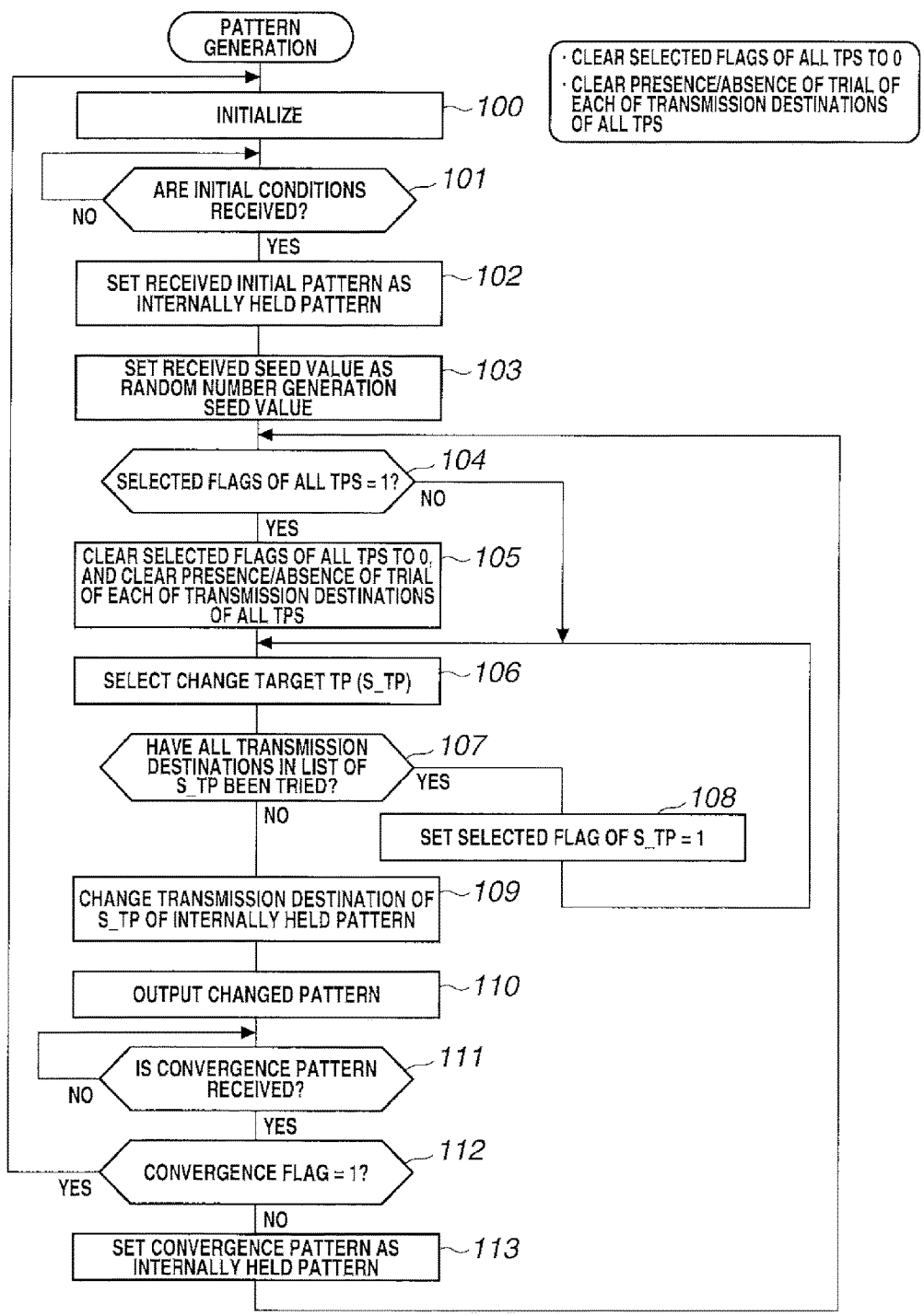
FIG. 2 is a flowchart illustrating pattern generation processing according to the first embodiment.

In a flowchart illustrating pattern generating process shown in FIG. 2, upon receiving a start instruction from the outside of the scheduling apparatus 10, the pattern generation unit 12 initializes the process (step 100). In this initialization process, the selected flags of all the TPs are cleared to 0, and the presence/absence of trial of each of the transmission destinations of all the TPs is cleared.

Subsequently, the pattern generation unit 12 receives the initial conditions from the initial condition generation unit 11 (step 101), sets the received initial pattern as an internally held pattern (step 102), and sets the received seed value as a random number generation seed value (step 103).

The pattern generation unit 12 confirms the selected flags of all the TPs (step 104). When not all the selected flags of the TPs are 1 (selected) (NO in step 104), one of the TPs is randomly selected as a change target point S_TP based on a random number generated from the seed value (step 106); otherwise (YES in step 104), all the selected flags of the TPs are cleared to 0, and the presence/absence of trial of each of the transmission destinations of all the TPs is cleared (step 105). Then, the process advances to step 106.

The pattern generation unit 12 confirms the presence/absence of trial of each of the transmission destinations described in the transmission destination UE list of S_TP among TP-specific transmission destination UE lists input from the outside of the scheduling apparatus 50 (step 107). When all the transmission destinations have been tried (YES in step 107), the selected flag of S_TP is set to 1 (step 108), and the process returns to step 106.

On the other hand, when not all the transmission destinations have been tried (NO in step 107), the pattern generation unit 12 randomly selects one of the UEs in which presence/absence of trial of the transmission destination indicates "absence" in the transmission destination UE list of S_TP, sets the selected UE as a new transmission destination of S_TP of the internally held pattern, and sets the presence/absence of trial of the selected UE to "presence" (step 109). The pattern generation unit 12 sequentially generates a new pattern by changing some of TP-UE combinations of the internally held pattern, in this example, only a combination associated with S_TP, and outputs the generated pattern to the pattern evaluation unit 13 (step 110).

After that, the pattern generation unit 12 receives the convergence pattern and convergence flag from the convergence determination unit 15 (step 111), and confirms the convergence flag (step 112). When the convergence flag=1 and a convergence of the evaluation value has been detected (YES in step 112), the process returns to step 100 and new pattern generation based on different initial conditions starts to perform a new search by the hill-climbing method.

On the other hand, when the convergence flag=0 and no convergence of the evaluation value has been detected (NO in step 112), the pattern generation unit 12 sets the received convergence pattern as the internally held pattern (step 113), and returns to step 104 to start pattern generation based on the received convergence pattern. This allows the search in progress to be continuously performed by the hill-climbing method.

<Pattern Evaluation Unit>

The pattern evaluation unit 13 has a function of sequentially calculating, every time the pattern generation unit 12 outputs a pattern, the evaluation value of the pattern, and a function of outputting the evaluated pattern and the calculated evaluation value to the candidate pattern selection unit 14.

The pattern evaluation unit 13 is basically the same as that shown in FIG. 15 described above.

The evaluation function indicates the sum of TP-specific lower evaluation values calculated based on external evaluation information input from the outside of the scheduling apparatus 10, and each lower evaluation value is a value obtained by dividing the instantaneous throughput of the transmission destination UE of the corresponding TP by an average throughput based on a proportional-fairness method (non-patent literature 2). The external evaluation information at this time represents, for example, the average throughput of each UE, the untransmitted data amount of each UE, and the TP-specific channel quality state of each UE. The channel quality state is indicated by, for example, CQI (Channel Quality Indicator) fed back from the UE (non-patent literatures 3 and 4).

<Candidate Pattern Selection Unit>

The candidate pattern selection unit 14 has a function of comparing, every time the pattern generation unit 12 outputs a pattern, the evaluation value of the pattern with that of the candidate pattern, sequentially selecting, as a new candidate pattern, the pattern having the higher evaluation value, and sequentially outputting the selected pattern.

The candidate pattern selection unit 14 is basically the same as that shown in FIG. 15 described above except that the candidate pattern selection unit 14 returns the selected state of the candidate pattern to the initial state when the convergence flag output from the convergence determination unit 15 is 1.

Figure 3:
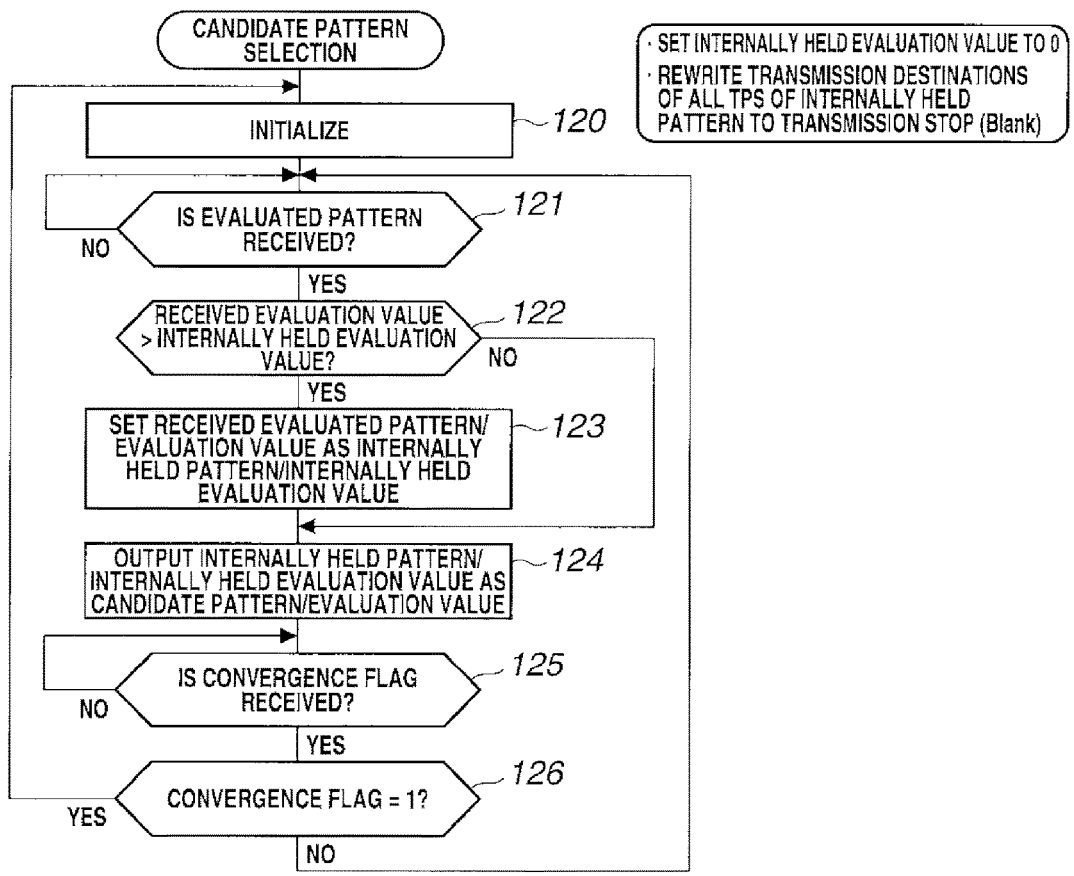
FIG. 3 is a flowchart illustrating candidate pattern selection processing according to the first embodiment.

In a flowchart illustrating candidate pattern selecting process shown in FIG. 3, upon receiving a start instruction from the outside of the scheduling apparatus 10, the candidate pattern selection unit 14 initializes the process (step 120). In this initialization process, the internally held evaluation value is set to 0 and the transmission destinations of all the TPs of the internally held pattern are rewritten to indicate a transmission stop (Blank).

The candidate pattern selection unit 14 receives the evaluated pattern from the pattern evaluation unit 13 together with the evaluation value (step 121), and compares the received evaluation value with the internally held evaluation value (step 122). When the received evaluation value is equal to or smaller than the internally held evaluation value (NO in step 122), the candidate pattern selection unit 14 outputs the candidate pattern including the internally held pattern and the evaluation value to the convergence determination unit 15 (step 124).

On the other hand, when the received evaluation value is larger than the internally held evaluation value (YES in step 122), the candidate pattern selection unit 14 sets the received evaluated pattern and evaluation value as the internally held pattern and internally held evaluation value (step 123), and advances to step 124.

After that, the candidate pattern selection unit 14 stands by until a convergence flag indicating a convergence determination result output from the convergence determination unit 15 is received in correspondence with the output candidate pattern (step 125), and confirms the received convergence flag (step 126). When the convergence flag=1 and a convergence of the evaluation value has been detected (YES in step 126), the process returns to step 120 and evaluation of a new pattern generated based on different initial conditions starts to perform a new search by the hill-climbing method. Note that the convergence flag may be confirmed after a predetermined time elapses since the candidate pattern is output. The predetermined time is, for example, a time required from when the convergence determination unit 15 executes convergence determination process corresponding to the output candidate pattern until the candidate pattern selection unit 14 is notified of the result (convergence flag).

On the other hand, when the convergence flag=0 and no convergence of the evaluation value has been detected (NO in step 126), the candidate pattern selection unit 14 returns to step 104 to start pattern generation based on the received convergence pattern. This allows the search in progress to be continued by the hill-climbing method.

<Convergence Determination Unit>

The convergence determination unit 15 has a function of selecting, when it is detected that the evaluation value of the candidate pattern output from the candidate pattern selection unit 14 has converged to a predetermined extreme value, the candidate pattern as a convergence pattern, and a function of instructing the initial condition generation unit 11 to generate/output a different initial pattern, instructing the pattern generation unit 12 to perform initialization and newly start pattern generation, and instructing the candidate pattern selection unit 14 to initialize the candidate pattern.

Figure 4:
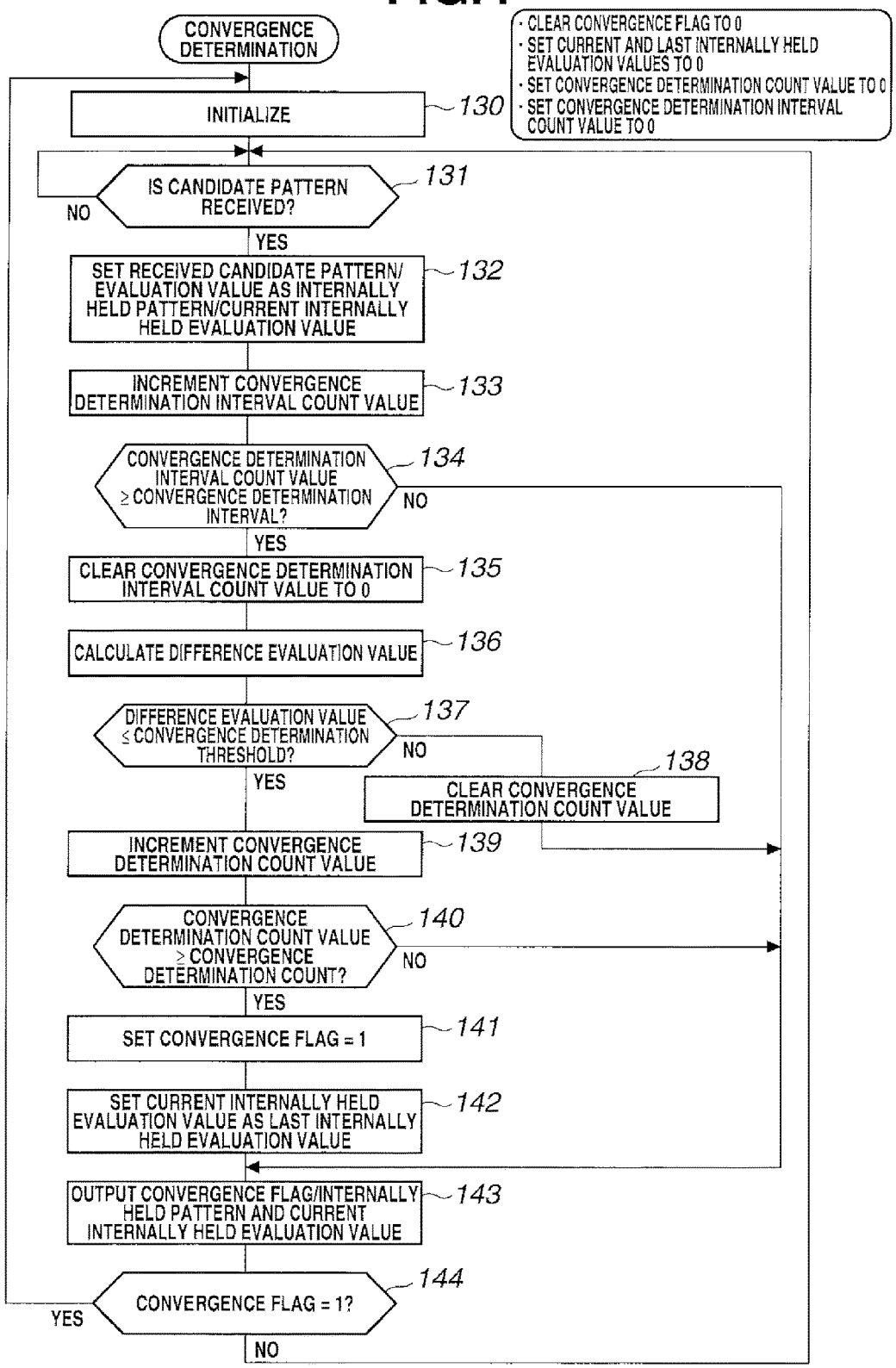
FIG. 4 is a flowchart illustrating convergence determination processing according to the first embodiment.

In a flowchart illustrating convergence determination process shown in FIG. 4, upon receiving a start instruction from the outside of the scheduling apparatus 10, the convergence determination unit 15 initializes the processing (step 130). In this initialization process, the convergence flag is cleared to 0, and a current internally held evaluation value, a last internally held evaluation value, a convergence determination count value, and a convergence determination interval count value are respectively set to 0.

Subsequently, the convergence determination unit 15 receives the candidate pattern and evaluation value from the candidate pattern selection unit 14 (step 131), and sets the received candidate pattern and evaluation value as the internally held pattern and the current internally held evaluation value (step 132).

The convergence determination unit 15 increments (+1) the convergence determination interval count value (step 133), and compares the convergence determination interval count value with a convergence determination interval (step 134).

When the convergence determination interval count value is equal to or smaller than the convergence determination interval (YES in step 134), the convergence determination unit 15 clears the convergence determination interval count value to 0 (step 135), and calculates a difference of the evaluation values by subtracting the last internally held evaluation value from the current internally held evaluation value (step 136).

After that, the convergence determination unit 15 compares the difference of the evaluation values with a convergence determination threshold (step 137). When the difference of the evaluation values is equal to or smaller than the convergence determination threshold (YES in step 137), which indicates a change in evaluation value is small and there is a convergence tendency, and thus the convergence determination unit 15 increments the convergence determination count value (step 139), and compares the convergence determination count value with a convergence determination count (step 140).

When the convergence determination count value has reached the convergence determination count (YES in step 140), the convergence determination unit 15 determines that the evaluation value has converged to the predetermined extreme value as the convergence tendency has continued up to a predetermined count, and sets the convergence flag to 1 (step 141).

After that, the convergence determination unit 15 sets the current internally held evaluation value as the last internally held evaluation value (step 142), outputs the convergence flag to the initial condition generation unit 11, the pattern generation unit 12, and the candidate pattern selection unit 14, outputs the convergence pattern including the current internally held evaluation value to the pattern generation unit 12 and the transmission pattern selection unit 16, and outputs the evaluation value to the transmission pattern selection unit 16 (step 143).

Note that when it is determined in step 134 that the convergence determination interval count value is smaller than the convergence determination interval (NO in step 134), and when it is determined in step 140 that the convergence determination count value has not reached the convergence determination count (NO in step 140), the process advances to step 143.

When it is determined in step 137 that the difference evaluation value is larger than the convergence determination threshold (NO in step 137), which indicates that a change in evaluation value is large and there is no convergence tendency, and thus the convergence determination unit 15 sets the convergence determination count value to 0 (step 138), and advances to step 143.

After that, the convergence determination unit 15 confirms the convergence flag (step 144). When the convergence flag=1 and a convergence of the evaluation value has been detected (YES in step 144), the process returns to step 130 and convergence determination for a new pattern generated based on different initial conditions starts to perform a new search by the hill-climbing method.

On the other hand, when the convergence flag=0 and no convergence of the evaluation value has been detected (NO in step 144), the process returns to step 131 to start convergence determination for the candidate pattern and evaluation value newly output from the candidate pattern selection unit 14. This continues the search in progress to be continued by the hill-climbing method.

<Transmission Pattern Selection Unit>

The transmission pattern selection unit 16 has a function of selecting, as a transmission pattern, one of the convergence patterns selected by the convergence determination unit 15, which has the highest evaluation value, and outputting the transmission pattern to the end determination unit 17.

Figure 5:
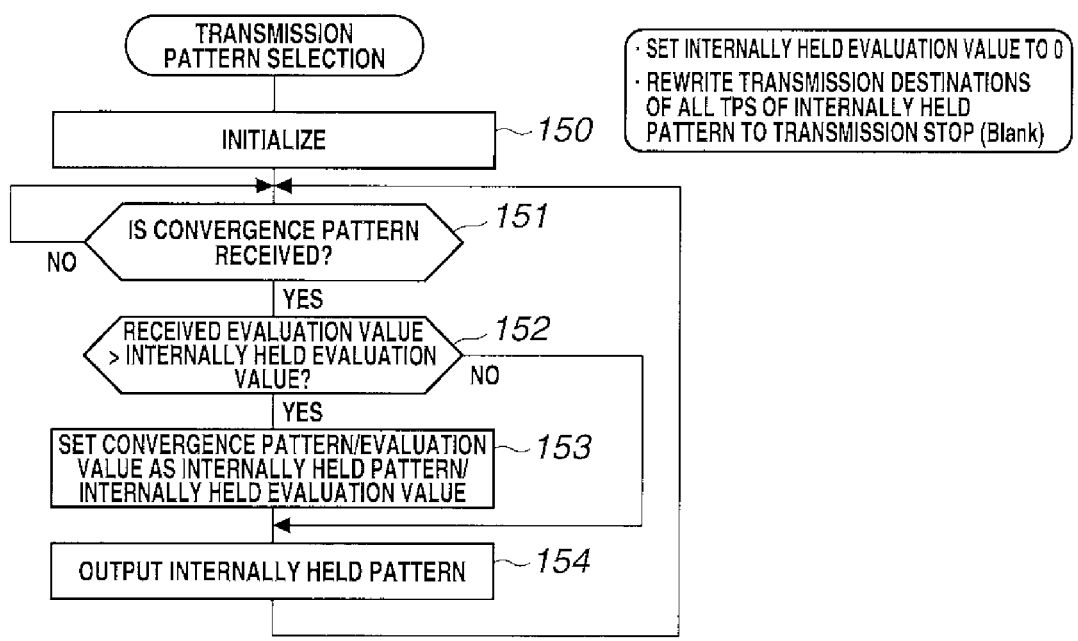
FIG. 5 is a flowchart illustrating transmission pattern selection processing according to the first embodiment.

In a flowchart illustrating transmission pattern selection processing shown in FIG. 5, upon receiving a start instruction from the outside of the scheduling apparatus 10, the transmission pattern selection unit 16 initializes the process (step 150). In this initialization process the internally held evaluation value is set to 0 and the transmission destinations of all the TPs of the internally held pattern are rewritten to indicate a transmission stop (Blank).

Subsequently, the transmission pattern selection unit 16 receives the convergence pattern from the convergence determination unit 15 together with the evaluation value (step 151), and compares the received evaluation value with the internally held evaluation value (step 152). When the received evaluation value is equal to or smaller than the internally held evaluation value (NO in step 152), the transmission pattern selection unit 16 outputs the internally held pattern as a transmission pattern to the end determination unit 17 (step 154), and returns to step 151.

On the other hand, when the received evaluation value is larger than the internally held evaluation value (YES in step 152), the received convergence pattern and evaluation value are set as the internally held pattern and internally held evaluation value (step 153), and the process advances to step 154.

<End Determination Unit>

The end determination unit 17 has a function of selecting, when the evaluation count for the patterns generated by the pattern generation unit 12 reaches the upper limit of the evaluation count that is input from the outside of the scheduling apparatus 10, the transmission pattern selected by the transmission pattern selection unit 16 as an optimum transmission pattern, and a function of outputting the optimum transmission pattern, that is, outputting a scheduling result and the end flag=1 to the outside of the scheduling apparatus 10. The end determination unit 17 is the same as that shown in FIG. 15 described above.

Note that a search algorithm for searching for a convergence pattern does not necessarily have to be the hill-climbing method. For example, it is possible to apply well-known solutions to a combinatorial optimization problem, such as a greedy algorithm of repeating pattern generation until an evaluation value increases within a cycle, a branch and cut method of generating a pattern so as to satisfy constraints after dividing patterns into groups in accordance with a difference in number of transmission points for which a transmission stop is preset and determining, based on the representative evaluation values of the groups, a group that is meticulously searched, and dynamic programming for holding two or more patterns at the same time by leaving two or more user equipment candidates as transmission destinations.

The above embodiment has exemplified the example of selecting one transmission point as a change target point. However, the number of transmission points selected as change target points need not be one. For example, two or more transmission points may be selected as change target points, and a pattern in which user equipments as the transmission destinations of two transmission points are simultaneously changed is generated. Even if two or more transmission points that are irrelevant in terms of the radio wave state between the transmission points are selected based on the radio wave state between the transmission points perceived by measurement or estimation, it is possible to simultaneously select user equipments as the transmission destinations of the two transmission points without influencing each other, thereby obtaining an effect of shortening the time until user equipments as the transmission destinations of all the transmission points are selected.

The above embodiment has exemplified the example in which every time a user equipment as the transmission destination of the selected transmission point is determined, the pattern is output as a candidate pattern. However, the timing of reflecting the determination of the user equipment as the transmission destination on the candidate pattern is not limited to this. For example, when user equipments as the transmission destinations of all the transmission points are determined, that is, when selection of all the transmission points is completed, this may be reflected on the candidate pattern and then the pattern may be output.

[Effect of First Embodiment]

As described above, in this embodiment, the convergence pattern selection unit 10A sequentially generates a plurality of different patterns based on designated initial conditions, selects, as a convergence pattern, a pattern whose evaluation value has converged to an extreme value, and repeatedly executes selection of the convergence pattern by changing the initial conditions every time the convergence pattern is selected, and the transmission pattern determination unit 10B selects, as an optimum transmission pattern, one of the convergence patterns obtained by the convergence pattern selection unit 10A, which has the highest evaluation value.

More specifically, in the convergence pattern selection unit 10A, the initial condition generation unit 11 generates and outputs an initial pattern and a seed value as initial conditions to be used to generate a pattern, the pattern generation unit 12 generates, from the initial pattern, a plurality of different patterns by sequentially changing some of combinations selected based on a random number generated from the seed value, and sequentially outputs the generated patterns, the pattern evaluation unit 13 sequentially calculates, every time the pattern generation unit 12 outputs the pattern, the evaluation value of the pattern, the candidate pattern selection unit 14 compares, every time the pattern generation unit 12 outputs the pattern, the evaluation value of the pattern with that of a candidate pattern, selects, as a new candidate pattern, the pattern having the higher evaluation value, and sequentially outputs the selected pattern, and the convergence determination unit 15 selects, when it is detected that the evaluation value of the candidate pattern output from the candidate pattern selection unit 14 has converged, the candidate pattern as a convergence pattern, instructs the initial condition generation unit 11 to change one or both of the initial pattern and the seed value as the initial conditions, instructs the pattern generation unit 12 to perform initialization and newly start pattern generation, and instructs the candidate pattern selection unit 14 to initialize the candidate pattern.

In the transmission pattern determination unit 10B, the transmission pattern selection unit 16 selects, as a transmission pattern, one of the convergence patterns selected by the convergence determination unit 15, which has the highest evaluation value, and the end determination unit 17 selects, when the evaluation count for the generated patterns reaches the upper limit of the evaluation count, the transmission pattern selected by the transmission pattern selection unit 16 as an optimum transmission pattern.

Then, at the start of pattern generation, the pattern generation unit 12 selects, as a change target transmission point, one of the transmission points of the initial pattern output from the initial condition generation unit 11, based on the random number generated from the seed value, generates a pattern by changing a user equipment as a transmission destination only for the change target transmission point, and outputs the generated pattern. Every time the convergence determination unit 15 outputs the convergence pattern, the pattern generation unit 12 selects one of the transmission points of the convergence pattern as a change target point, generates a pattern by changing a user equipment as a transmission destination only for the change target transmission point, and outputs the generated pattern. The convergence determination unit 15 calculates, for every two patterns output at a predetermined convergence determination interval among the candidate patterns sequentially output from the candidate pattern selection unit 14, the change amount between the evaluation values of the two patterns, and detects, when it is continuously determined by the convergence determination count that the obtained change amount is smaller than the convergence determination threshold, that the evaluation value has converged.

With this arrangement, selection of the convergence pattern is repeatedly executed a plurality of times by changing the initial pattern every time the convergence pattern in which evaluation value has converged to the extreme value is selected by the hill-climbing method, and one of the obtained convergence patterns, which has the highest evaluation value, is selected as an optimum transmission pattern. Therefore, as compared to a case in which an initially found extreme value is selected as a final convergence value and the subsequent search is ended, it is possible to select, as an optimum transmission pattern, a pattern having a higher convergence value.

In the scheduling process, the scheduling period is defined. Thus, there is the upper limit of the evaluation count, and it is necessary to appropriately distribute the evaluation count to searches. According to this embodiment, since a new search starts after convergence is detected, it is possible to avoid a situation in which the evaluation count is short in one search and a next search is executed before convergence. Furthermore, starting a new search after detecting a convergence is equivalent to distributing a necessary and sufficient evaluation count to each of the searches, thereby making it possible to efficiently use the limited evaluation count.

In this embodiment, the initial condition generation unit 11 may generate a seed value to be used to generate a pattern and output it when outputting the initial pattern first, and generate a seed value having a unique value and output it every time the convergence determination unit 15 detects a convergence. When selecting a change target transmission point, the pattern generation unit 12 may select the change target transmission point based on a random number generated from the seed value output from the initial condition generation unit 11.

In general, a random number generated by calculation processing is a pseudo random number formed from a random number sequence determined based on the seed value. As the seed value changes, the random number sequence also changes. Thus, random numbers are generated in a different order. Consequently, every time the evaluation converges, a unique seed value is generated, and change target points are sequentially selected in a different order. When starting a new search by the hill-climbing method every time the evaluation value converges, convergence patterns can be searched by a route completely different from the last route, thereby implementing an efficient search with an unbiased search range.

[Second Embodiment]

A scheduling apparatus 10 according to the second embodiment of the present invention will be described next with reference to FIG. 6.

This arrangement is different from the first embodiment in that TP-specific transmission destination UE lists are input to an initial condition generation unit 11, and an initial pattern output from the initial condition generation unit 11 after detection of a convergence is different from that according to the first embodiment.

That is, in this embodiment, the initial condition generation unit 11 has a function of, when outputting an initial pattern first, generating and outputting an initial pattern in which a transmission stop is set for all transmission points, and every time a convergence determination unit 15 detects a convergence, selecting, for a selected one of the transmission points, one of user equipments which can set the transmission point as a transmission source as a new transmission destination, generating an initial pattern in which transmission stop is set for the transmission points except for that transmission point, and outputting it.

Figure 6:
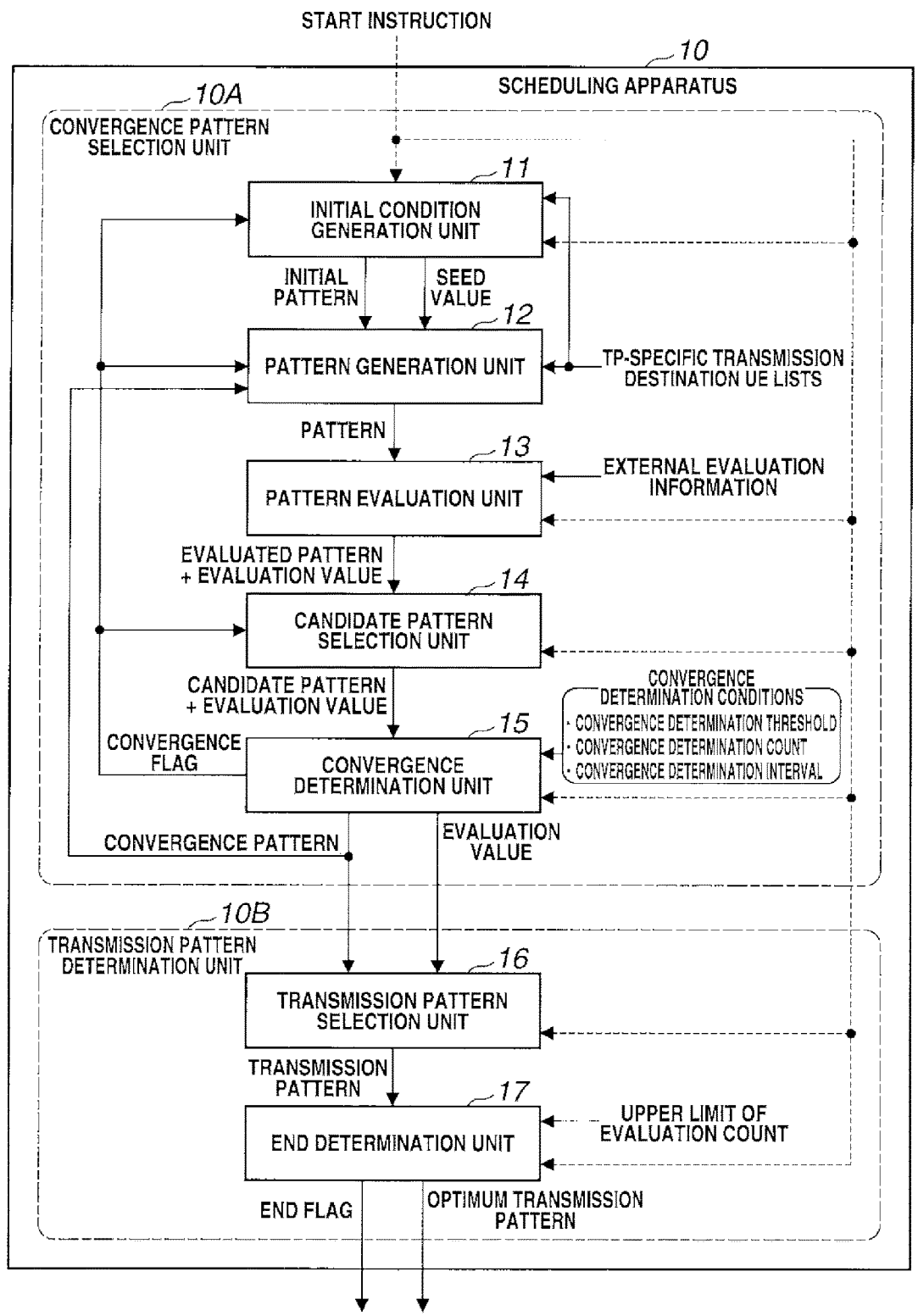
FIG. 6 is a block diagram showing the arrangement of a scheduling apparatus according to the second embodiment.

Referring to FIG. 6, the TP-specific transmission destination UE lists input from the outside of the scheduling apparatus 10 are also input to the initial condition generation unit 11 in addition to a pattern generation unit 12. The remaining components are the same as those in the first embodiment.

Figure 7:
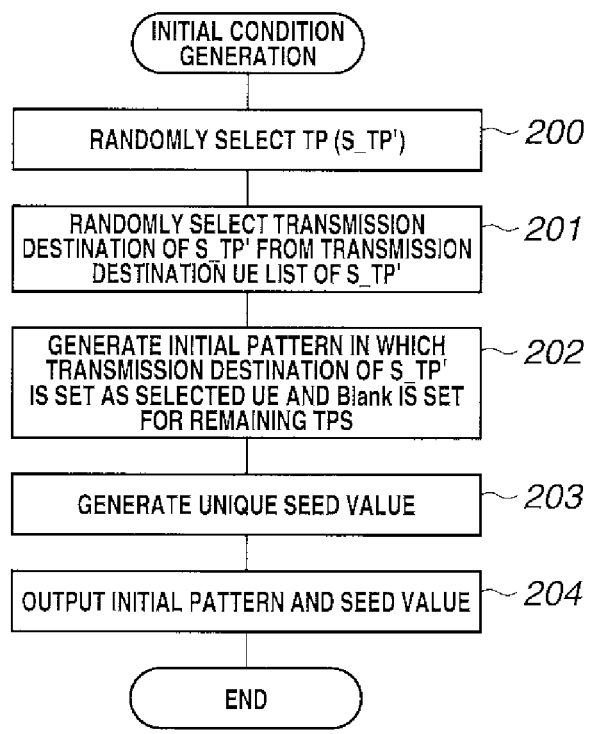
FIG. 7 is a flowchart illustrating initial condition generation processing according to the second embodiment.

When the convergence determination unit 15 outputs a convergence flag=1 indicating detection of a convergence of an evaluation value, the initial condition generation unit 11 executes initial condition generation processing shown in FIG. 7.

Referring to FIG. 7, the initial condition generation unit 11 randomly selects one TP as S_TP' (step 200), and randomly selects a new transmission destination UE from the transmission destination UE candidate list of S_TP' (step 201).

The initial condition generation unit 11 generates an initial pattern in which only the transmission destination of S_TP' is set as the selected new transmission destination UE, and all the transmission destinations of the TPs other than S_TP' are set to indicate a transmission stop (Blank) (step 202).

Subsequently, after generating a seed value including a unique value different from the seed value that has been used so far (step 203), the initial condition generation unit 11 outputs the new initial pattern and seed value to the pattern generation unit 12 (step 204), thereby ending the series of initial condition generation processes.

Note that in FIG. 7, the reason why the seed value is changed after the initial pattern is updated is that S_TP selected first after initialization in the pattern generation unit 12 is made different from S_TP'. This can increase the possibility that a different convergence value is obtained. In an initial pattern generated immediately after the start instruction, the transmission destinations of all the TPs are set to "Blank".

In this embodiment, when generating an initial pattern after detecting a convergence, the transmission destination UE of S_TP' is randomly set. However, a transmission destination UE in a pattern (under the condition that "Blank" is set for TPs other than S_TP') having the second highest evaluation value may be set.

[Effect of Second Embodiment]

In this embodiment, when outputting an initial pattern first, the initial condition generation unit 11 generates and outputs the initial pattern in which a transmission stop is set for all transmission points. Every time the convergence determination unit 15 detects convergence, the initial condition generation unit 11 selects, for a selected one of the transmission points, as a new transmission destination, one of user equipments which can set the transmission point as a transmission source, generates an initial pattern in which a transmission stop is set for the transmission points except for that transmission point, and outputs it.

With this arrangement, every time the evaluation value converges, a different transmission point is set as an initial transmission point whose transmission destination is to be changed. Therefore, when starting a new search by the hill-climbing method every time the evaluation value converges, convergence patterns can be searched from a start point different from the last start point, thereby implementing an efficient search with an unbiased search range.

[Third Embodiment]

A scheduling apparatus 10 according to the third embodiment of the present invention will be described next with reference to FIG. 8.

Figure 8:
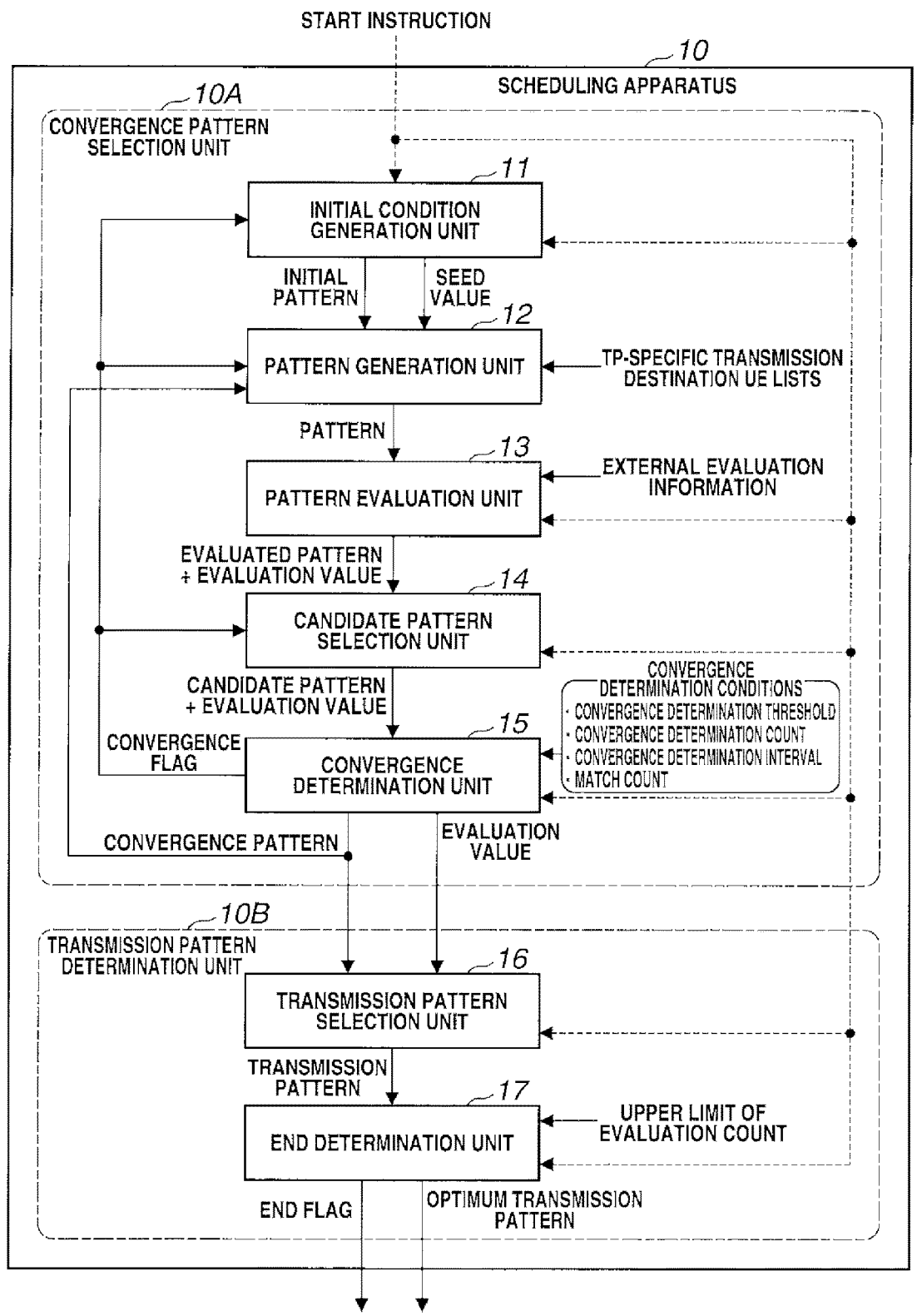
FIG. 8 is a block diagram showing the arrangement of a scheduling apparatus according to the third embodiment.

As shown in FIG. 8, this arrangement is basically the same as in the first embodiment except for convergence determination conditions input to a convergence determination unit 15 and the operation of the convergence determination unit 15.

That is, the convergence determination unit 15 according to this embodiment has a table for recording the evaluation value of a candidate pattern sequentially output from a candidate pattern selection unit 14, and has a function of recording the evaluation value in the table at an interval of a convergence determination count before detecting an initial convergence and, once a convergence is detected, comparing, every time the candidate pattern selection unit 14 newly outputs the evaluation value, the output evaluation value with the evaluation value recorded in the table, and determining, when it is continuously determined by a predetermined match determination count that the evaluation values match, that the evaluation value has converged.

Note that in this embodiment, only the first result is stored in the table, and the evaluation value is only compared with the first result. The result to be compared with is not necessarily the first result. For example, a plurality of tables may be provided, results other than the first result may be stored, and the evaluation value may be compared with all the stored evaluation values. In this case, when it is continuously determined by the predetermined match determination count that one or more evaluation values match, it is determined that the evaluation value has converged.

In this embodiment, when no convergence value is obtained in the search when storing the second or subsequent result, the table may be overwritten at the time of the next search. For example, when no convergence value is obtained in the second search, the second result stored halfway is overwritten with the third result. When comparison with only the first result is performed, the same convergence pattern may be obtained in the second or subsequent search. To the contrary, by comparing the evaluation value with a result in which a convergent value is obtained in the second or subsequent search, the effect of readily obtaining a different result of a convergence pattern is produced.

In this embodiment, two tables each for storing a result may be provided. One of the tables stores the first result, as similar to the above-described embodiment, and the other stores the second result. When a convergence pattern is obtained in the second search, the evaluation value of the convergence pattern is compared with that of the convergence pattern obtained in the first search, and the table storing the convergence pattern having the lower evaluation value is overwritten with the third result. With this arrangement, even if the evaluation value of the convergence pattern obtained in the first search is low, comparison with a convergence pattern having a high evaluation value obtained in the second or subsequent search is possible and comparison of a convergence tendency at the time of a search can be performed only once. Furthermore, only two tables each for holding a result need to be provided, thereby obtaining the effect of reducing the scale.

With this arrangement, transition of the evaluation value in the first search is recorded in the table. When the evaluation value transits in the same way in the second or subsequent search, it is determined that the same convergence pattern is obtained, and thus a convergence is determined even before the convergence, and re-execution starts.

Figure 9:
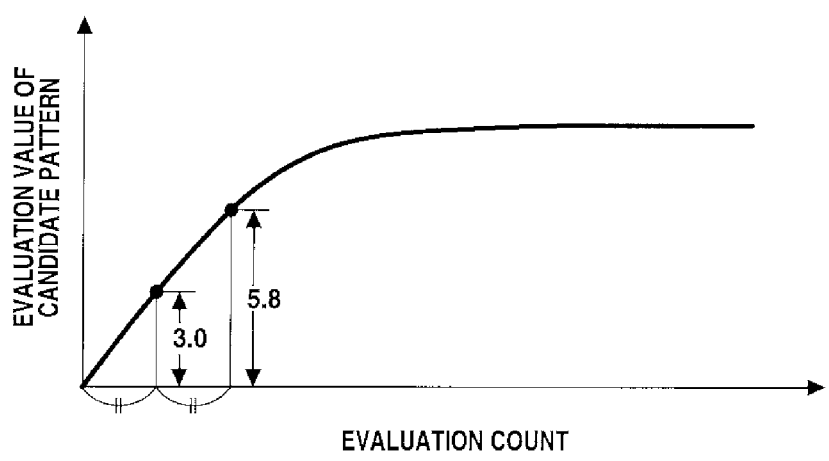
FIG. 9 is an explanatory view showing transition of a pattern evaluation value.

In transition of the pattern evaluation value shown in FIG. 9, (a) of FIG. 9 is a graph showing transition of the pattern evaluation value, and (b) of FIG. 9 shows an example of recording of the evaluation value in the table.

Figure 10:
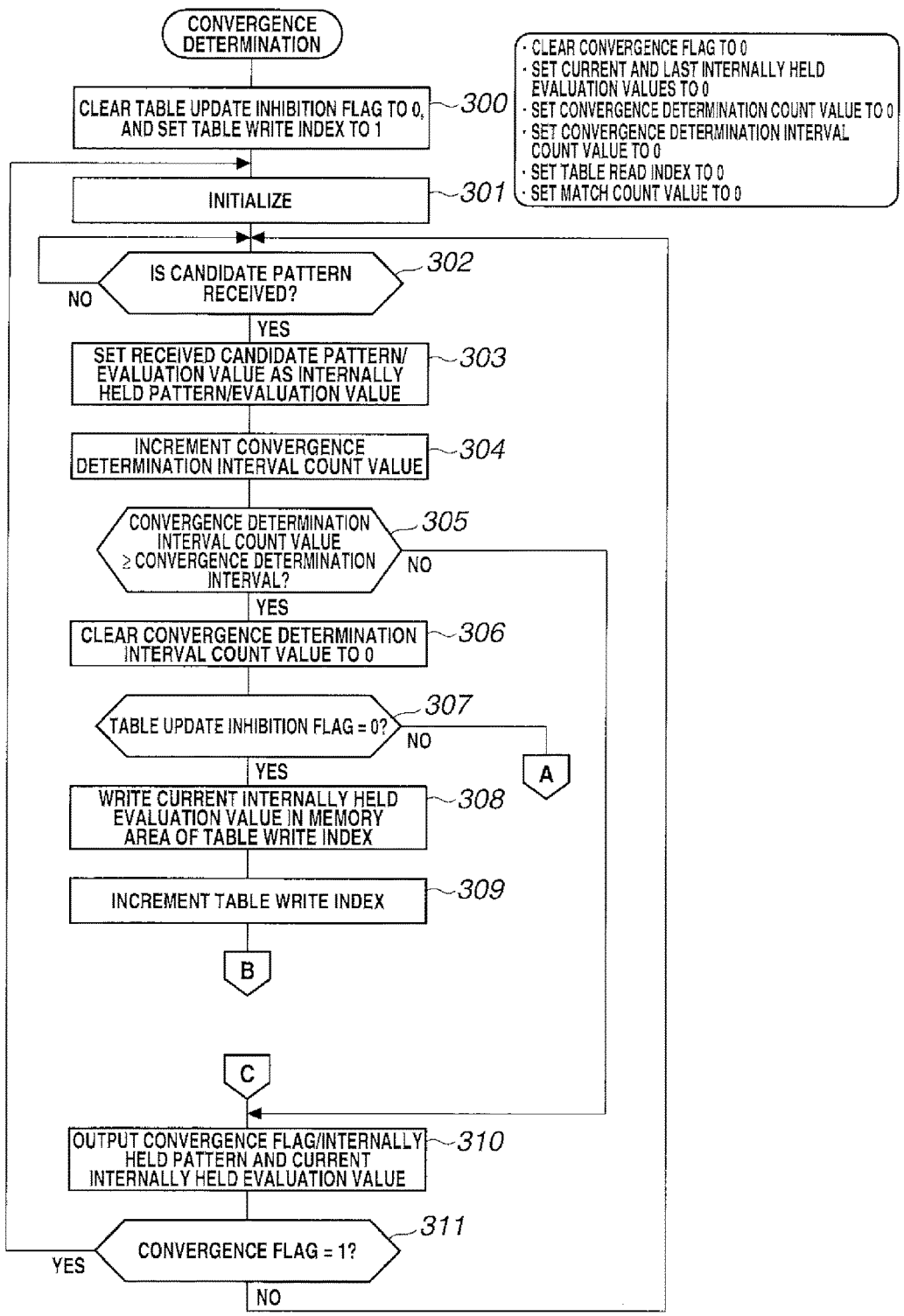
FIG. 10 is a flowchart illustrating convergence determination processing according to the third embodiment.
Figure 11:
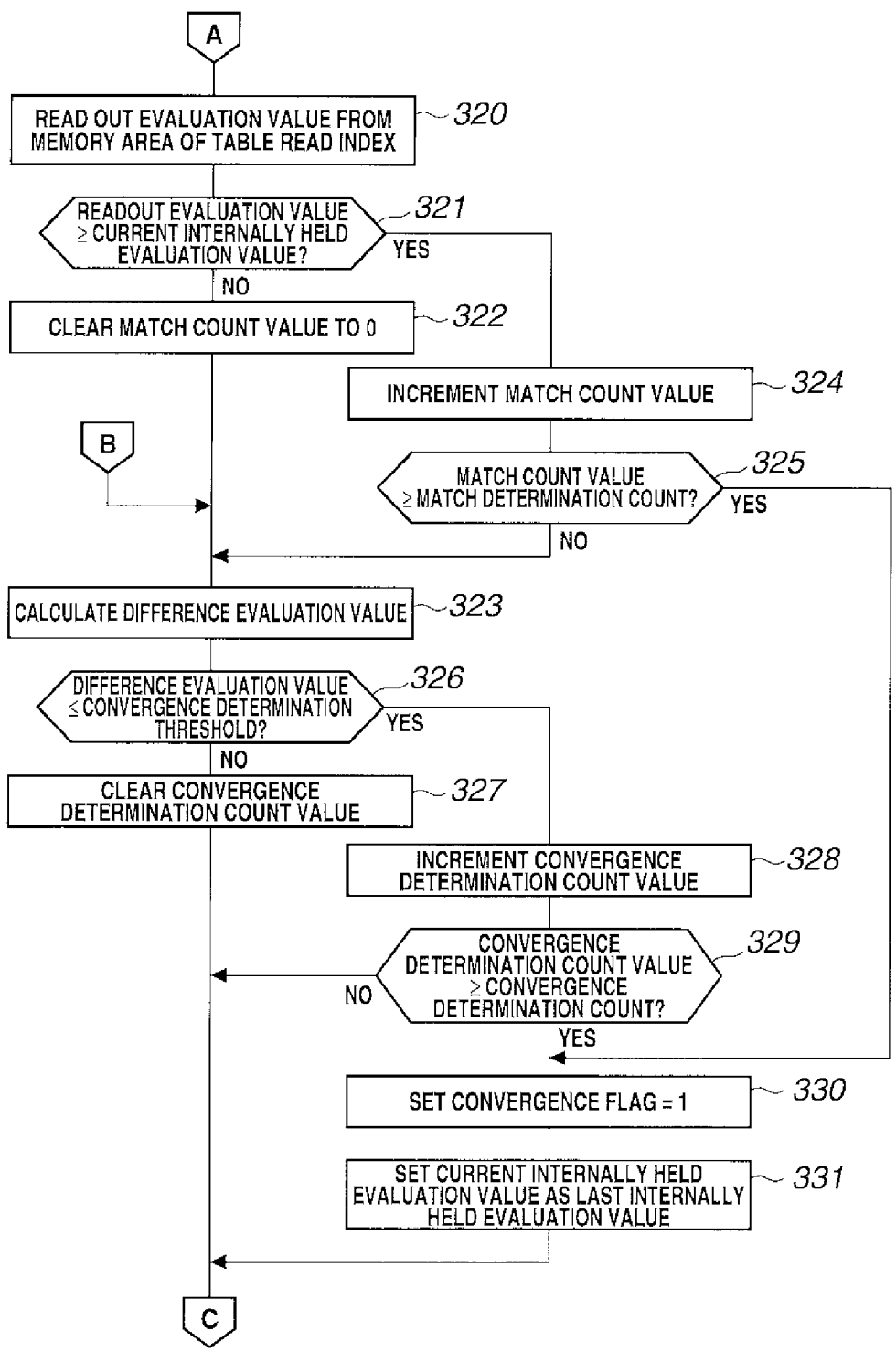
FIG. 11 is a flowchart illustrating the convergence determination processing (continued) according to the third embodiment.

A convergence process shown in FIGS. 10 and 11 has a feature in which a current internally held evaluation value is recorded in the table at a convergence determination interval in addition to the processing shown in FIG. 4 described above, and in the second or subsequent search, the evaluation value recorded in the table is compared with the current internally held evaluation value at the convergence determination interval, and when the number of times it is determined that the evaluation value recorded in the table matches the current internally held evaluation value reaches a match determination count input from the outside of the scheduling apparatus 10, the convergence is forcibly determined.

For this purpose, the convergence determiner 15 newly includes a table update inhibition flag (update is inhibited in the second or subsequent search) for identifying whether the search is the first one, and a table write index/table read index indicating a write/read position in the table. A match counter for measuring the number of times it is continuously determined that values match is newly included in the table.

Referring to FIG. 10, upon receiving a start instruction from the outside of the scheduling apparatus 10, the convergence determination unit 15 sets the table update inhibition flag to 0 (update permission) while setting the table write index to 1 (step 300), and then initializes the processing (step 301). In this initialization processing, the convergence flag is cleared to 0, and the current internally held evaluation value, a last internally held evaluation value, a convergence determination count value, and a convergence determination interval count value are respectively set to 0. In addition, the table read index and the match count value are respectively set to 0.

Subsequently, the convergence determination unit 15 receives a candidate pattern and an evaluation value from the candidate pattern selection unit 14 (step 302), and sets the received candidate pattern and evaluation value as an internally held pattern and the current internally held evaluation value (step 303).

The convergence determination unit 15 increments (+1) the convergence determination interval count value (step 304), and compares the convergence determination interval count value with a convergence determination interval (step 305). When the convergence determination interval count value is larger than the convergence determination interval (NO in step 305), the process advances to step 310 (to be described later) of FIG. 10.

At this time, when the convergence determination interval count value is equal to or smaller than the convergence determination interval (YES in step 305), the convergence determination unit 15 clears the convergence determination interval count value to 0 (step 306), and confirms the table update inhibition flag (step 307).

When the table update inhibition flag=1 and update of the table is inhibited (NO in step 307), the process advances to step 320 of FIG. 11.

On the other hand, when the table update inhibition flag=0 and update of the table is permitted (YES in step 307), the convergence determination unit 15 writes the current internally held evaluation value in the memory area of the table write index of the table (step 308), and increments the table write index (step 309), thereby advancing to step 323 of FIG. 11.

In step 320 of FIG. 11, the convergence determination unit 15 reads out the evaluation value from the memory area of the table read index of the table (step 320), and compares the readout evaluation value with the current internally held evaluation value (step 321).

When the readout evaluation value is equal to or larger than the current internally held evaluation value (NO in step 321), the convergence determination unit 15 clears the match count value to 0 (step 322), and advances to step 323 (to be described later).

On the other hand, when the readout evaluation value is smaller than the current internally held evaluation value (YES in step 321), the convergence determination unit 15 increments the match count value (step 324), and compares the match count value with a match determination count (step 325).

When the match count value has not reached the match determination count (NO in step 325), the process advances to step 323 (to be described later); otherwise (YES in step 325), the process advances to step 330.

In step 323, the convergence determination unit 15 calculates a difference evaluation value by subtracting the last internally held evaluation value from the current internally held evaluation value (step 323), and compares the difference evaluation value with a convergence determination threshold (step 326).

When the difference evaluation value is larger than the convergence determination threshold (NO in step 326), a change in evaluation value is large and there is no convergence tendency, and thus the convergence determination unit 15 sets the convergence determination count value to 0 (step 327), thereby advancing to step 310 of FIG. 10.

On the other hand, when the difference evaluation value is equal to or smaller than the convergence determination threshold (YES in step 326), a change in evaluation value is small and there is a convergence tendency, and thus the convergence determination unit 15 increments the convergence determination count value (step 328), and compares the convergence determination count value with the convergence determination count (step 329).

When the convergence determination count value has not reached the convergence determination count (NO in step 329), the process advances to step 310 of FIG. 10.

When the convergence determination count value has reached the convergence determination count (YES in step 329), the convergence determination unit 15 determines that the evaluation value has converged to a predetermined extreme value since the convergence tendency has continued for a predetermined count, and sets the convergence flag to 1 (step 330), and then sets the current internally held evaluation value as the last internally held evaluation value (step 331), thereby advancing to step 310 of FIG. 10.

In step 310 of FIG. 10, the convergence determination unit 15 outputs the convergence flag to an initial condition generation unit 11, a pattern generation unit 12, and the candidate pattern selection unit 14, outputs the convergence pattern including the current internally held evaluation value to the pattern generation unit 12 and a transmission pattern selection unit 16, and outputs the evaluation value to the transmission pattern selection unit 16 (step 310).

After that, the convergence determination unit 15 confirms the convergence flag (step 311). When the convergence flag=1 and a convergence of the evaluation value has been detected (YES in step 311), the process returns to step 301 and a convergence determination for a new pattern generated based on different initial conditions starts to perform a new search by the hill-climbing method.

On the other hand, when the convergence flag=0 and no convergence of the evaluation value has been detected (NO in step 311), the process returns to step 302 to start convergence determination for the candidate pattern and evaluation value newly output from the candidate pattern selection unit 14. This continues the search in progress by the hill-climbing method.

Note that in the above example, a match is determined when the current internally held evaluation value with the first result is equal to or smaller than the predetermined threshold. However, a match determination method is not limited to this. For example, when a difference from the first result is equal to or larger than the threshold but the evaluation value is lower than the first result, a match may be determined. That is, in step 321 of FIG. 11, although the determination condition is "=" in the above embodiment, "≥" is set as a determination condition in this case. This can reduce the possibility that a result worse than the first result is obtained.

Alternatively, the threshold may be gradually decreased. At the initial stage of a search, the threshold is set large. As the search progresses, the threshold may be decreased.

Figure 12:
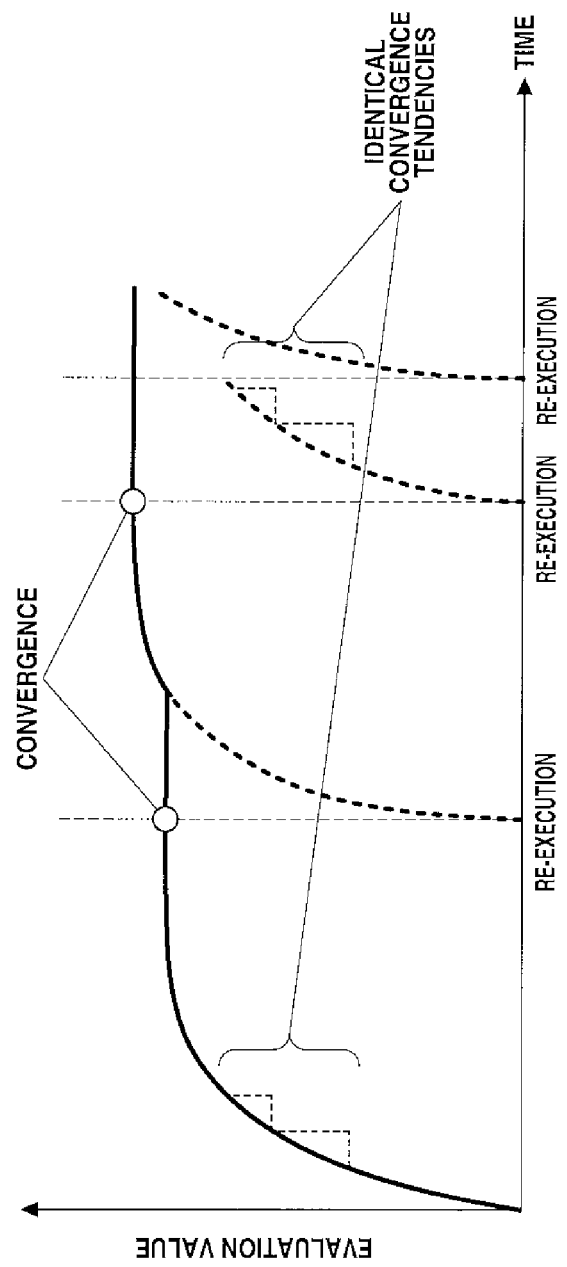
FIG. 12 is timing chart for explaining the relationship between the evaluation value and an elapsed time according to the third embodiment.

In an example, shown in FIG. 12, of the relationship between the evaluation value and the elapsed time, in the first search, a search is repeated until the evaluation value converges to obtain a convergence pattern. After the convergence pattern is obtained, the initial conditions are changed to perform re-execution. In the second search, a search is performed while comparing whether a convergence tendency is the same as that in the first search. In this case, since the convergence tendencies in the first and second searches are different, a search is repeated until a convergence value is obtained without interrupting the second search. Similarly, the third search starts. Since a convergence tendency in the third search is compared with that in the first search, and it is determined that the convergence tendencies are identical, the search is interrupted before a convergence value is obtained, and the initial conditions are changed to perform re-execution.

[Effect of Third Embodiment]

As described above, the convergence determination unit 15 includes a table for recording the evaluation value of a candidate pattern sequentially output from the candidate pattern selection unit 14. Before detecting an initial convergence, the convergence determination unit 15 records the evaluation value in the table at an interval of a convergence determination count. Once a convergence is detected, every time the candidate pattern selection unit 14 newly outputs the evaluation value, the convergence determination unit 15 compares the output evaluation value with the evaluation value recorded in the table, and determines, when it is continuously determined by the predetermined match determination count that the evaluation values match, that the evaluation value has converged.

With this arrangement, transition of the evaluation value in the first search is recorded in the table. When the evaluation value transits in the same way in the second or subsequent search, it is determined that the same convergence pattern is obtained, and thus a convergence is determined even before the convergence, and re-execution starts. Therefore, before the evaluation value actually converges, the convergence can be forcibly determined, thereby making it possible to shorten the time required for the scheduling processing.

[Fourth Embodiment]

The arrangement of a scheduling apparatus 10 according to the fourth embodiment of the present invention will be described next with reference to FIG. 13.

Figure 13:
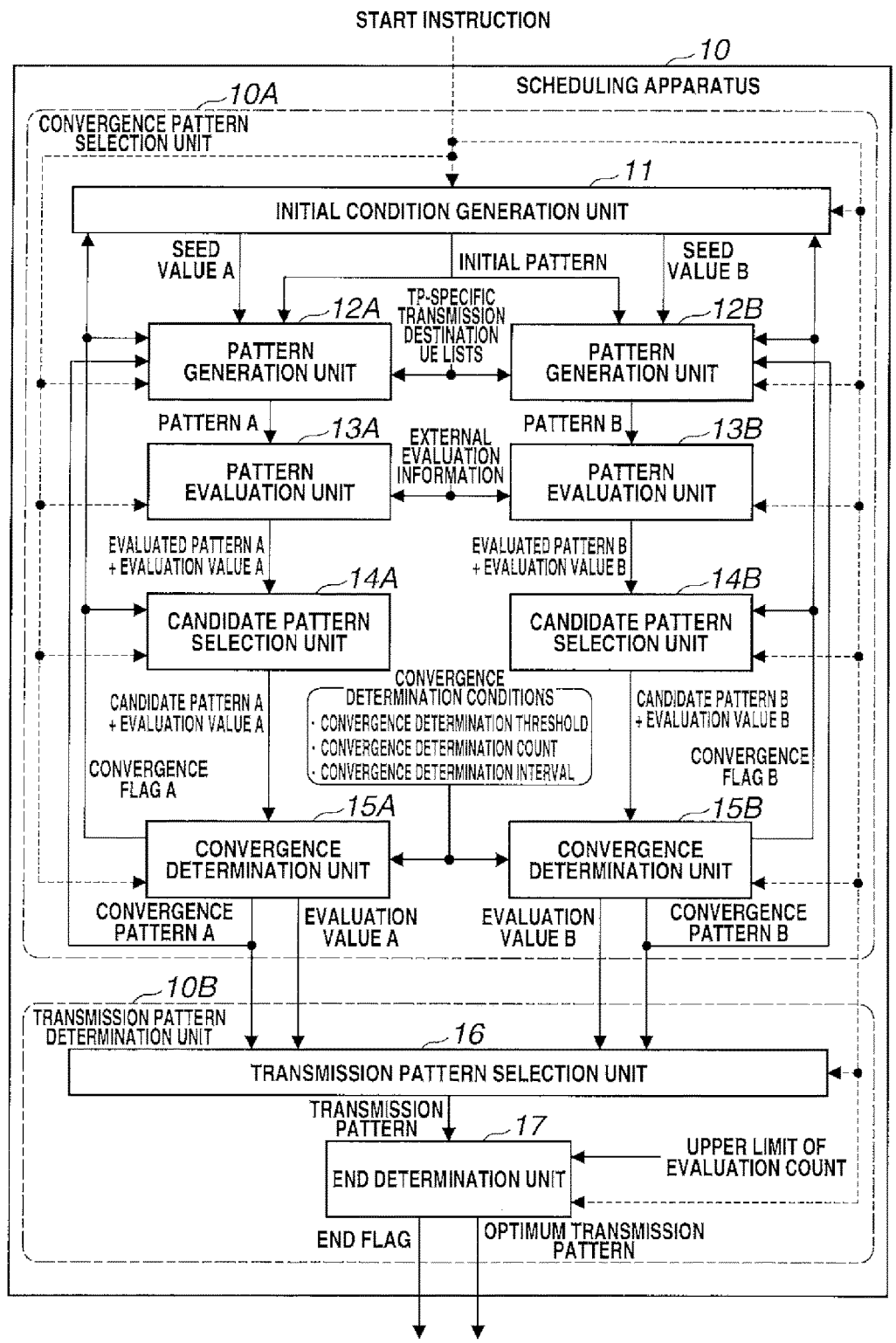
FIG. 13 is a block diagram showing the arrangement of a scheduling apparatus according to the fourth embodiment.

This arrangement is obtained by arranging, in parallel, pattern generation units 12, pattern evaluation units 13, candidate pattern selection units 14, and convergence determination units 15 according to the first embodiment, as shown in FIG. 13. This arrangement can select a transmission pattern from more convergence patterns.

That is, the scheduling apparatus 10 according to this embodiment includes a plurality of processing systems each including the pattern generation unit 12, pattern evaluation unit 13, candidate pattern selection unit 14, and convergence determination unit 15.

An initial condition generation unit 11 has a function of generating and outputting different seed values for the respective processing systems.

A transmission pattern selection unit 16 has a function of selecting, as a transmission pattern, one of convergence patterns output from the processing systems, which has the highest evaluation value.

In the example of the arrangement shown in FIG. 13, processing system A including a pattern generation unit 12A, a pattern evaluation unit 13A, a candidate pattern selection unit 14A, and a convergence determination unit 15A, and processing system B including a pattern generation unit 12B, a pattern evaluation unit 13B, a candidate pattern selection unit 14B, and a convergence determination unit 15B are provided. The initial condition generation unit 11, the transmission pattern selection unit 16, and an end determination unit 17 are common to processing systems A and B. The number of processing systems arranged in parallel is two but the present invention is not limited to this.

In this arrangement, upon receiving a start instruction from the outside of the scheduling apparatus 10, the initial condition generation unit 11 outputs an initial pattern and seed values A and B to the pattern generation units 12A and 12B. Seed values A and B respectively output to the pattern generation units 12A and 12B are different from each other, but the same initial pattern is sequentially output to the pattern generation units 12A and 12B.

When the convergence determination unit 15A outputs convergence flag A, the initial condition generation unit 11 generates seed value A that is unique in all the processing systems, and outputs it to the pattern generation unit 12A together with the initial pattern. Similarly, when the convergence determination unit 15B outputs convergence flag B, the initial condition generation unit 11 generates seed value B that is unique in all the processing systems, and outputs it to the pattern generation unit 12B together with the initial pattern. This can execute parallel processes under different initial conditions.

The transmission pattern selection unit 16 is the same as that according to the first embodiment, and selects, as a transmission pattern, one of the convergence patterns output from the convergence determination units 15A and 15B, which has the highest evaluation value, and outputs the selected pattern to the end determination unit 17.

[Effect of Fourth Embodiment]

As described above, in this embodiment, the plurality of processing systems each including the pattern generation unit 12, the pattern evaluation unit 13, the candidate pattern selection unit 14, and the convergence determination unit 15 are provided. The initial condition generation unit 11 generates and outputs different seed values for the respective processing systems. The transmission pattern selection unit 16 selects, as a transmission pattern, one of the convergence patterns output form the processing systems, which has the highest evaluation value.

This parallelly executes searches based on the different seed values for the respective processing systems. Therefore, it is possible to select a transmission pattern from more convergence patterns within a short processing time.

[Extension of Embodiments]

The present invention has been described above with reference to the embodiments, but is not limited to these embodiments. Various changes understandable by those skilled in the art can be made for the arrangements and details of the present invention without departing from the scope of the invention. In addition, the embodiments can be arbitrarily combined and implemented within a consistent range.

EXPLANATION OF THE REFERENCE NUMERALS AND SIGNS

10 . . . scheduling apparatus, 10A . . . convergence pattern selection unit, 10B . . . transmission pattern determination unit, 11 . . . initial condition generation unit, 12, 12A, 12B . . . pattern generation unit, 13, 13A, 13B . . . pattern evaluation unit, 14, 14A, 14B . . . candidate pattern selection unit, 15, 15A, 15B . . . convergence determination unit, 16 . . . transmission pattern selection unit, 17 . . . end determination unit

The invention claimed is:

1. A scheduling apparatus that generates a plurality of patterns each indicating combinations of a plurality of transmission points forming a radio network system and user equipments for performing radio communication with the plurality of transmission points, and selects an optimum transmission pattern indicating optimum combinations of transmission points and user equipments based on evaluation values of the plurality of patterns by a predetermined search algorithm, the apparatus comprising:
    a convergence pattern selection unit configured to execute a convergence pattern selection, the convergence pattern selection including generating sequentially a plurality of patterns based on designated initial conditions, and selecting, as a convergence pattern, a pattern which has an evaluation value converged to an extreme value, and, as a convergence pattern is selected, repeatedly execute the convergence pattern selection to select another convergence pattern by changing the designated initial conditions; and
    a transmission pattern determination unit configured to select, as the optimum transmission pattern, one convergence pattern with the highest evaluation value out of the convergence patterns obtained by the convergence pattern selection unit, wherein the convergence pattern selection unit includes
    an initial condition generation unit configured to generate and output an initial pattern and a seed value as the designated initial conditions,
    a pattern generation unit configured to sequentially generate the plurality of patterns by sequentially changing some of the combinations of the initial pattern output from the initial condition generation unit based on a random number generated from the seed value;
    a pattern evaluation unit configured to sequentially calculate, as each of the plurality of patterns is output from the pattern generation unit, an evaluation value of the pattern output by the respective pattern generation unit,
    a candidate pattern selection unit configured to compare, as the pattern generation unit outputs each of plurality of patterns, the evaluation value of the respective pattern output by the pattern generation unit with the evaluation value of a candidate pattern, to select, as another candidate pattern, the pattern with a higher evaluation value, and sequentially outputs a plurality of candidate patterns, and
    a convergence determination unit configured to select, as the convergence pattern, the latest candidate pattern among the plurality of candidate patterns sequentially output from the candidate pattern selection unit, when detecting a convergence of the evaluation value, to instruct the initial condition generation unit to change one or both of the initial pattern and seed value as the designated initial conditions, to instruct the pattern generation unit to perform initialization and newly start pattern generation, and to instruct the candidate pattern selection unit to initialize the candidate pattern, wherein the convergence of the evaluation value is detected when a change amount calculated between the evaluation values of every two candidate patterns sequentially output at a predetermined convergence determination interval from the candidate pattern selection unit is continuously determined to be smaller than a convergence determination threshold for a number of convergence determination times.

2. The scheduling apparatus according to claim 1, wherein the initial condition generation unit generates and outputs, when outputting the initial pattern for the first time, a seed value to be used when generating the initial pattern, and generates and outputs another seed value having a unique value which is different from other seed values that have been used as the convergence determination unit detects a convergence of the evaluation value, and
the pattern generation unit selects, when selecting a change target transmission point based on the random number, a change target transmission point based on the random number generated from the seed value output from the initial condition generation unit.

3. The scheduling apparatus according to claim 2, comprising:
    a plurality of processing systems each including the pattern generation unit, the pattern evaluation unit, the candidate pattern selection unit, and the convergence determination unit,
    wherein the initial condition generation unit generates and outputs seed values for the processing systems that are different from each other, and
    the transmission pattern determination unit selects, as the transmission pattern, one convergence pattern with the highest evaluation value out of the convergence patterns output from the processing systems.

4. The scheduling apparatus according to claim 1, wherein the initial condition generation unit generates and outputs, when outputting the initial pattern for the first time, a pattern in which a transmission stop is set for all the transmission points as the initial pattern, and every time the convergence determination unit detects the convergence, the initial condition generation unit selects, for a selected one of the transmission points, one of user equipments that can have the respective transmission point as a transmission source as a new transmission destination, and generates and outputs a pattern in which a transmission stop is set for the transmission points other than the transmission point as the initial pattern.

5. The scheduling apparatus according to claim 1, wherein the convergence determination unit includes at least a table for recording the evaluation values of the candidate patterns sequentially output from the candidate pattern selection unit, wherein the convergence determination unit records the evaluation value in the table at an interval of a convergence determination interval, compares, after the convergence of the evaluation value is detected for the first time, the output evaluation value with at least one evaluation value recorded in the table, every time the candidate pattern selection unit newly outputs the evaluation value, and determines that the evaluation value has converged when the evaluation value is continuously determined to be equal to or smaller than the recorded evaluation value a predetermined match determination time.

6. A scheduling method of generating a plurality of patterns each indicating combinations of a plurality of transmission points forming a radio network system and user equipments for performing radio communication with the plurality of transmission points, and selecting an optimum transmission pattern indicating optimum combinations of transmission points and user equipments based on evaluation values of the plurality of patterns by a predetermined search algorithm, the method comprising:

a convergence pattern selection step of executing a convergence pattern selection including sequentially generating a plurality of patterns based on designated initial conditions, and selecting, as a convergence pattern, a pattern which has an evaluation value converged to an extreme value, and, as a convergence pattern is selected, repeatedly executing the convergence pattern selection to select another convergence pattern by changing the designated initial conditions; and a transmission pattern determination step of selecting, as the optimum transmission pattern, one convergence pattern with the highest evaluation value out of the convergence patterns obtained in the convergence pattern selection step, wherein the convergence pattern selection step includes:

an initial condition generation step of generating and outputting an initial pattern and a seed value as the designated initial conditions, a pattern generation step of sequentially generating the plurality of patterns by sequentially changing some of the combinations of the initial pattern based on a random number generated from the seed value;

a pattern evaluation step of sequentially calculating, as each of the plurality of patterns is generated, an evaluation value of the respective pattern, a candidate pattern selection step of comparing, as each of the plurality of patterns is generated, the evaluation value of the respective pattern generated with the evaluation value of a candidate pattern, to select, as another candidate pattern, the pattern with a higher evaluation value, and sequentially outputting a plurality of candidate patterns, and a convergence determination step of selecting, as the convergence pattern, the latest candidate pattern among the plurality of candidate patterns sequentially output, when detecting a convergence of the evaluation value, to instruct an initial condition generation unit to change one or both of the initial pattern and seed value as the designated initial conditions, to perform initialization and newly start pattern generation, and to initialize the candidate pattern, wherein the convergence of the evaluation value is detected when a change amount calculated between the evaluation values of every two candidate patterns sequentially output at a predetermined convergence determination interval is continuously determined to be smaller than a convergence determination threshold for a number of convergence determination times.

* * * * *